(12) United States Patent
Akiba

(10) Patent No.: US 7,757,937 B2
(45) Date of Patent: Jul. 20, 2010

(54) RIGHT-OF-USE TRANSFER SYSTEM

(75) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 12/172,818

(22) Filed: Jul. 14, 2008

(65) Prior Publication Data
US 2009/0020600 A1 Jan. 22, 2009

(30) Foreign Application Priority Data
Jul. 19, 2007 (JP) .............................. 2007-188620

(51) Int. Cl.
*G06F 17/00* (2006.01)
(52) U.S. Cl. ............................ 235/375; 726/26; 726/28; 726/30; 726/33; 713/176; 713/189
(58) Field of Classification Search ................. 235/375; 726/26, 28, 30, 33; 713/176, 189
See application file for complete search history.

(56) References Cited

U.S. PATENT DOCUMENTS

| 2003/0149670 A1 * | 8/2003 | Cronce ........................ 705/59 |
| 2005/0256805 A1 * | 11/2005 | Satkunanathan et al. ...... 705/59 |
| 2006/0137022 A1 * | 6/2006 | Kilian-Kehr et al. .......... 726/27 |
| 2006/0265758 A1 * | 11/2006 | Khandelwal et al. .......... 726/27 |
| 2009/0133131 A1 * | 5/2009 | Cronce et al. ................. 726/28 |
| 2009/0177893 A1 * | 7/2009 | Tan, Jr. ........................ 713/189 |

FOREIGN PATENT DOCUMENTS

JP 2004-139148 A 5/2004

* cited by examiner

*Primary Examiner*—Allyson N Trail
(74) *Attorney, Agent, or Firm*—Canon U.S.A., Inc. I.P. Division

(57) ABSTRACT

A license of an optional feature used in a transmission source apparatus can be properly transferred to a transmission destination apparatus. A first apparatus outputs a first license transmission code based on an identifier of designated application software and an identifier of the first apparatus. On receiving the first license transmission code, a second apparatus outputs a second license transmission code based on the first license transmission code, an identifier of the second apparatus, and a unique identifier. On receiving the second license transmission code, the first apparatus outputs a third license transmission code based on the second license transmission code and designated transfer details, and updates license information in the first apparatus in accordance with the designated transfer details. On receiving the third license transmission code, the second apparatus updates license information in the second apparatus based on the third license transmission code.

16 Claims, 20 Drawing Sheets

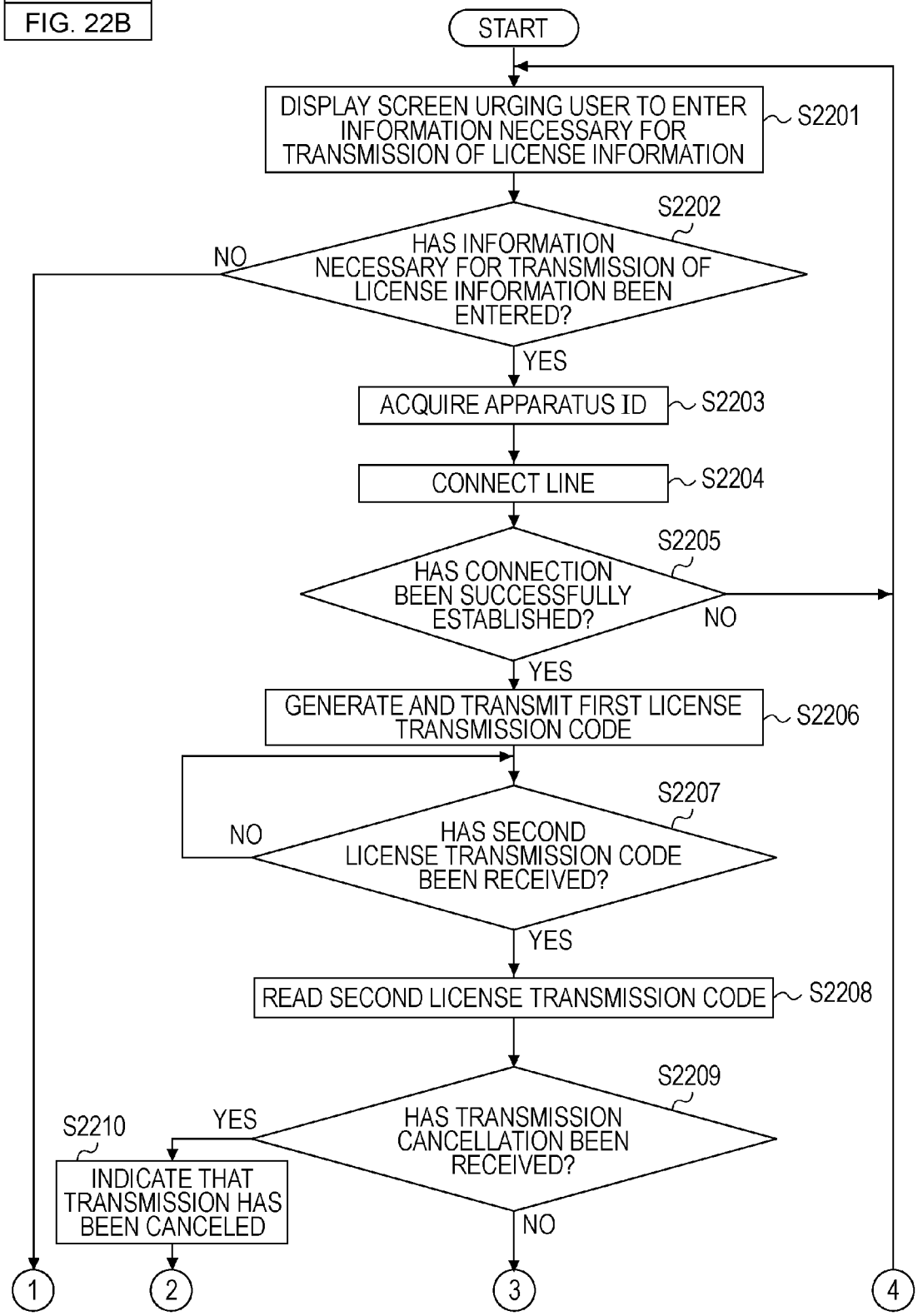

```
LICENSE TRANSMISSION (TRANSMISSION)

• COMPLETION OF LICENSE TRANSMISSION  ⟵ 2501
   TRANSMISSION DESTINATION : AAAAAAA
   APPLICATION NAME : XXXXXXXX  ⟵ 2502
       NUMBER OF TIMES : 100  ⟵ 2503

LICENSE TRANSMISSION HAS BEEN COMPLETED.

```
LICENSE TRANSMISSION (TRANSMISSION)

• CANCELLATION OF LICENSE TRANSMISSION  ⟵ 2601
   TRANSMISSION DESTINATION : AAAAAAA
   APPLICATION NAME : XXXXXXXX  ⟵ 2602
       NUMBER OF TIMES : 100  ⟵ 2603

! LICENSE TRANSMISSION HAS BEEN CANCELED.

[ CANCEL ]
```

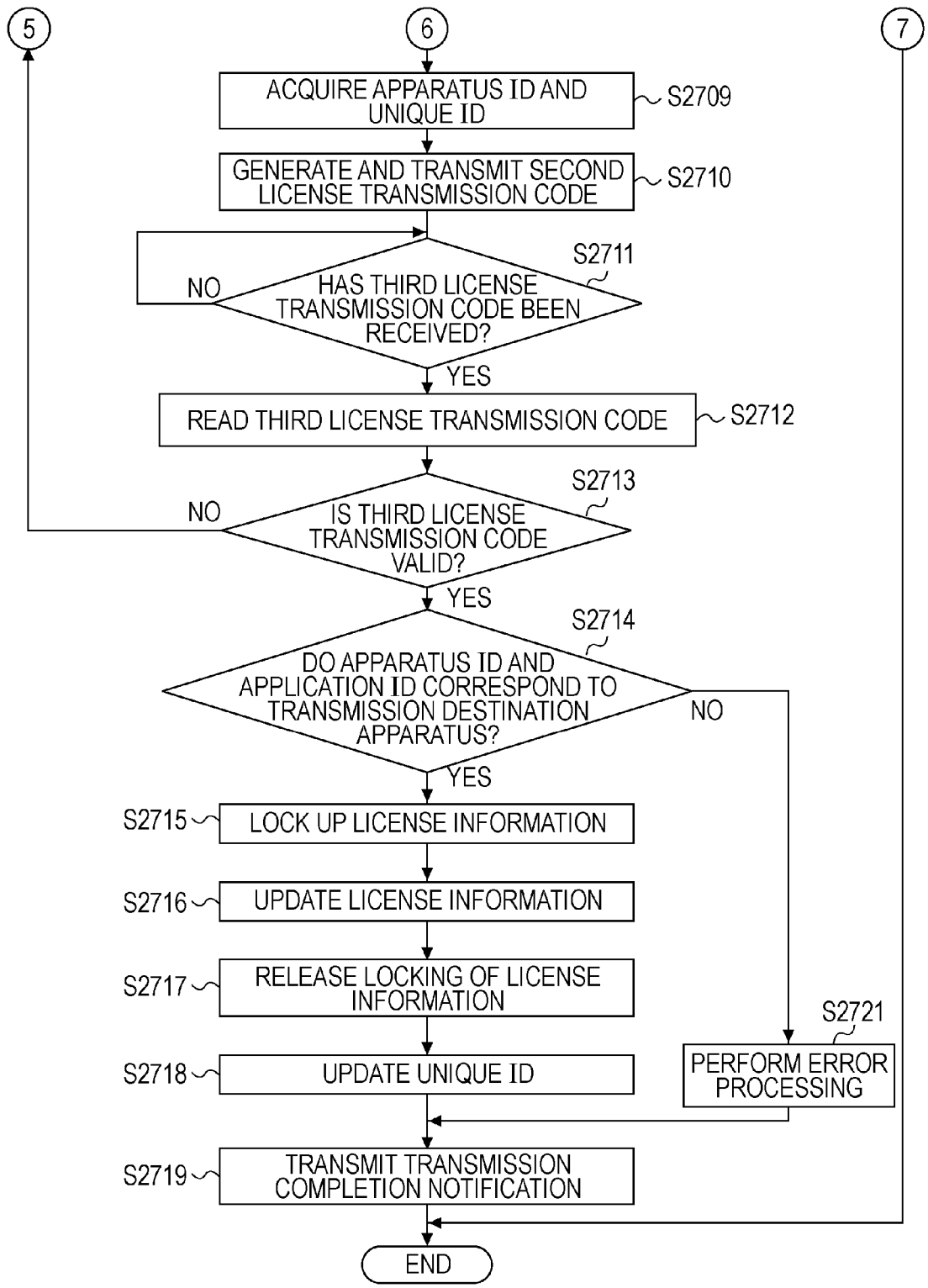

RIGHT-OF-USE TRANSFER SYSTEM

BACKGROUND OF THE INVENTION

1. Field of the Invention

The present invention relates to information processing apparatuses, right-of-use transfer systems, and computer programs, and more particularly, to an information processing apparatus, a right-of-use transfer system, and a computer program that can be suitably used for execution of application software based on right-of-use information indicating the right of use of the application software.

2. Description of the Related Art

Various procedures for providing an optional feature to an apparatus, such as a printer, have been available. More specifically, for example, a procedure in which an optional feature is installed into an apparatus when the apparatus is manufactured and a procedure in which a user purchases an apparatus and an optional feature together and the user installs the optional feature into the apparatus have been available.

In addition, a procedure has been available in which in the case where one or more optional features are built into a printer itself in advance and a user purchases the printer and the one or more optional features together, by setting a corresponding license key in the printer, the user is able to use the one or more optional features built into the printer. Since it is not desirable that an optional feature can be copied and used in a different printer of the same type, a unique license key must be provided. In a system using such a license key, a license is issued to an apparatus into which the optional feature is to be installed, in exchange for information unique to the apparatus. Accordingly, an unauthorized use of the optional feature (software) by an apparatus that is not the apparatus into which the optional feature is to be installed can be avoided.

As a procedure for implementing control of a license in an information processing apparatus, a license management system for performing management of a license in accordance with a software program provided with a license has been known. In addition, a license management system (for example, see Japanese Patent Laid-Open No. 2004-139148) for acquiring licenses from a plurality of apparatuses and distributing the licenses to the plurality of apparatuses in accordance with the remainders of licenses in the plurality of apparatuses has been known.

In such a license management system, an information processing apparatus can perform management of an identifier (ID) of an apparatus into which application software is to be installed so that the apparatus can implement the application software and an application ID of the application software itself. Then, the information processing apparatus issues a license to the apparatus on the basis of the apparatus ID and the application ID. Thus, when the license issued as described above is installed into the apparatus, the application software is enabled.

However, in the above-described procedures, management and issuance of a license regarding an optional device relating to manufacturing of apparatuses are not considered. In addition, since functions and structures are not sufficient, user-friendliness is not achievable.

In addition, for example, in a case where an end user purchases a new apparatus, the user may desire to continue to use software that has been used in an old apparatus in the new apparatus. In order to continue to use such software in the new apparatus, it is necessary to transmit license information of the software from the old apparatus to the new apparatus. However, in a known license management system, a function and a structure sufficient for revoking the license in the old apparatus and achieving transmission of the license between apparatuses while ensuring a valid use of the license are not provided.

As described above, it has been difficult to achieve transfer of a license (right of use) of application software that has been used in a source information processing apparatus, which serves as a transmission source from which the license is to be transmitted, from the source information processing apparatus to a destination information processing apparatus, which serves as a transmission destination to which the license is to be transmitted.

SUMMARY OF THE INVENTION

The present invention allows transfer of the right of use of application software that has been used in a source information processing apparatus, which serves as a transmission source from which the license is to be transmitted, from the source information processing apparatus to a destination information processing apparatus, which serves as a transmission destination to which the license is to be transmitted.

According to a first aspect of the present invention, an information processing apparatus for transferring a right of use of application software to a destination information processing apparatus includes a first generation unit configured to, when a user designates the application software, of which at least part of the right of use is to be transferred, generate a first code based on application identification information identifying the designated application software and apparatus identification information identifying the information processing apparatus; a first transmission unit configured to transmit the first code generated by the first generation unit; a first reception unit configured to receive a second code based on the first code and apparatus identification information identifying the destination information processing apparatus; a second reception unit configured to receive transfer detail information indicating transfer details of the right of use; a second generation unit configured to generate a third code based on the second code received by the first reception unit and the transfer detail information received by the second reception unit; a second transmission unit configured to transmit the third code generated by the second generation unit; and an updating unit configured to update right-of-use information indicating the right of use of the application software in the information processing apparatus based on the transfer detail information received by the second reception unit.

According to a second aspect of the present invention, an information processing apparatus for accepting transfer of a right of use of application software from a source information processing apparatus includes a first reception unit configured to receive a first code based on application identification information identifying the application software, of which at least part of the right of use is to be transferred, and apparatus identification information identifying the source information processing apparatus; a first generation unit configured to generate a second code based on the first code received by the first reception unit and apparatus identification information identifying the information processing apparatus; a first transmission unit configured to transmit the second code generated by the first generation unit; a second reception unit configured to receive a third code based on the second code and transfer detail information indicating transfer details of the right of use; and an updating unit configured to update right-of-use information indicating the right of use of the application software in the information processing apparatus based on the third code received by the second reception unit.

According to a third aspect of the present invention, a system includes a first information processing apparatus configured to transfer a right of use of application software; and a second information processing apparatus configured to accept the right of use of the application software. The first information processing apparatus includes a first generation unit configured to, when a user designates the application software, of which at least part of the right of use is to be transferred, generate a first code based on application identification information identifying the designated application software and apparatus identification information identifying the first information processing apparatus; a first transmission unit configured to transmit the first code generated by the first generation unit; a first reception unit configured to receive a second code based on the first code and apparatus identification information identifying the second information processing apparatus; a second reception unit configured to receive transfer detail information indicating transfer details of the right of use; a second generation unit configured to generate a third code based on the second code received by the first reception unit and the transfer detail information received by the second reception unit; a second transmission unit configured to transmit the third code generated by the second generation unit; and a first updating unit configured to update right-of-use information indicating the right of use of the application software in the first information processing apparatus based on the transfer detail information received by the second reception unit. The second information processing apparatus includes a third reception unit configured to receive the first code transmitted from the first transmission unit; a third generation unit configured to generate the second code based on the first code received by the third reception unit and the apparatus identification information identifying the second information processing apparatus; a third transmission unit configured to transmit the second code generated by the third generation unit; a fourth reception unit configured to receive the third code transmitted from the second transmission unit; and a second updating unit configured to update right-of-use information indicating the right of use of the application software in the second information processing apparatus based on the third code received by the fourth reception unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 25 illustrates an example of a display screen to be displayed when transmission of the license information has been completed.

FIG. 26 illustrates an example of a display screen to be displayed when transmission of the license information is canceled.

DESCRIPTION OF THE EMBODIMENTS

Exemplary embodiments of the present invention will now be described in detail in accordance with the accompanying drawings.

An exemplary embodiment of the present invention will be described with reference to the drawings.

Figure 1:
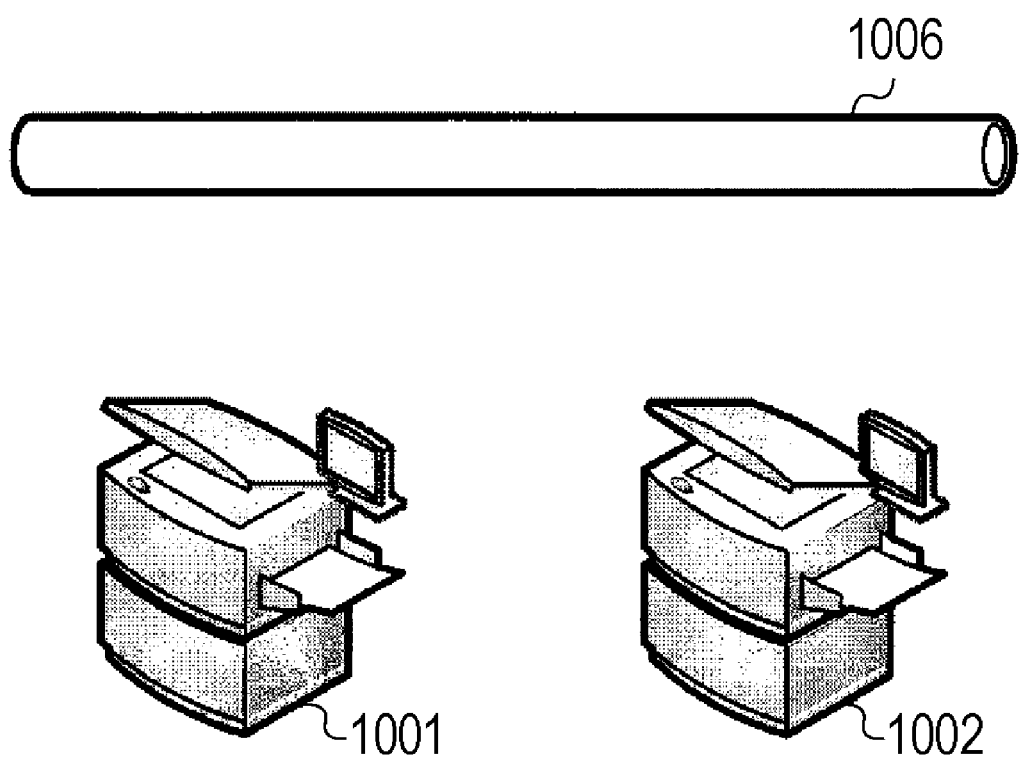
FIG. 1 shows an example of the configuration of a license transmission system according to an exemplary embodiment of the present invention.

FIG. 1 shows an example of the configuration of a license transmission system. Referring to FIG. 1, multifunction apparatuses (MFPs) 1001 and 1002 each have a function of reading originals, a function of performing printing, a function of transmitting images to an external apparatus, and the like. In this embodiment, when license information is transferred between the multifunction apparatuses 1001 and 1002, the multifunction apparatuses 1001 and 1002 are not necessarily connected to a network, such as a local-area network (LAN) 1006.

Figure 2:
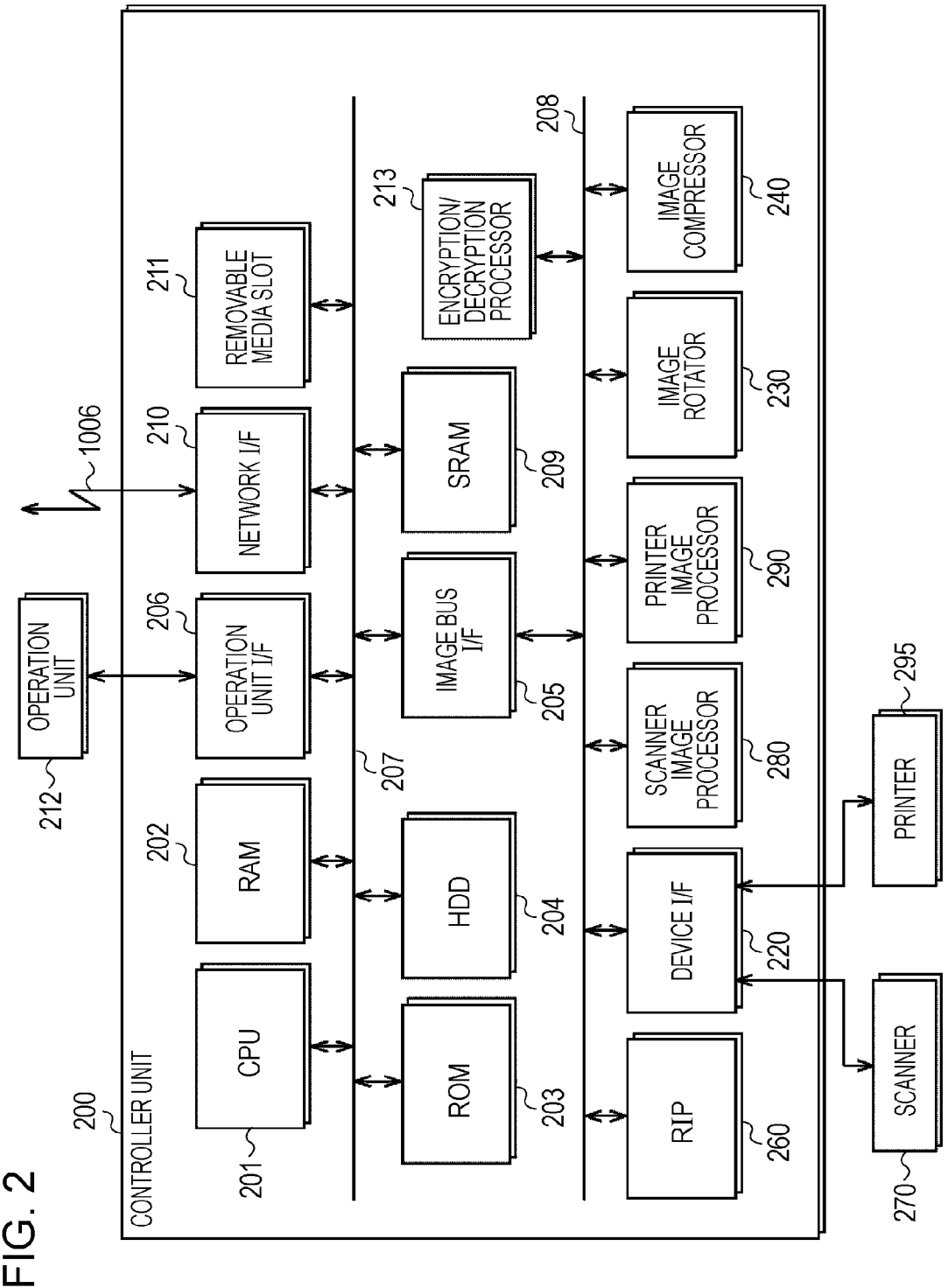
FIG. 2 is a block diagram showing an example of the hardware configuration of a multifunction apparatus.

FIG. 2 is a block diagram showing an example of the hardware configuration of each of the multifunction apparatuses 1001 and 1002 shown in FIG. 1. Referring to FIG. 2, a controller unit 200 serves as a controller for reception and transmission of document data (image data), image information, apparatus information, and the like. The controller unit 200 is connected to a scanner 270, which serves as an image reception device, and a printer 295, which serves as an image transmission device. The controller unit 200 controls the scanner 270 and the printer 295. Accordingly, functions of scanning, printing, and the like can be implemented.

The controller unit 200 is connected to an external apparatus, such as the multifunction apparatus 1002, via the LAN 1006. The controller unit 200 performs transmission and reception of image information and apparatus information to and from the external apparatus. The controller unit 200, which serves as an interface for providing the above-described functions to a user, is connected to an operation unit 212.

A central processing unit (CPU) 201 is a controller for controlling the controller unit 200. A random-access memory (RAM) 202 serves as a system work memory to be used for an operation of the CPU 201. The RAM 202 is used as an image memory for temporarily storing image data. A read-only memory (ROM) 203 serves as a boot ROM. A boot program for the system and the like are stored in the ROM 203.

A hard disk drive (HDD) 204 includes an integrated device electronics (IDE) controller. System software, image data, and management information for the system software and the image data are stored in the HDD 204. An application program, which is an optional feature of a multifunction apparatus, license information of the application program, an apparatus ID uniquely identifying the multifunction apparatus, an application ID uniquely identifying the application program, and the like are also stored in the HDD 204. A static random-access memory (SRAM) 209 is a nonvolatile memory in which setting data for the system and the like are stored.

An operation interface (I/F) 206 serves as an interface to be used for the operation unit 212. The operation I/F 206 outputs image data to be displayed to the operation unit 212. The operation I/F 206 also transmits to the CPU 201 information entered by the user through the operation unit 212.

A network interface (I/F) 210 is connected to the LAN 1006, so that information can be transmitted and received to and from the external apparatus, such as the multifunction apparatus 1002, connected to the LAN 1006.

A removable media slot 211 is a slot into which a removable data storage medium, such as a memory card, can be inserted, so that storing, reading, and the like of image data can be performed. In this embodiment, a memory card is used as a storage medium. The units described above are connected to a system bus 207.

An image bus interface (I/F) 205 is used to connect the system bus 207 to an image bus 208 through which image data is transmitted at high speed. The image bus I/F 205 is a bus bridge for converting a data structure. In this embodiment, the image bus 208 includes a peripheral component interconnect (PCI) bus or IEEE 1394. The units described below are connected to the image bus 208.

A raster image processor (RIP) 260 expands page description language (PDL) code, which is contained in a print job received from an external apparatus connected to the LAN 1006, into a bitmap image. An apparatus (device) interface (I/F) 220 is used to connect the scanner 270 and the printer 295, which serve as image reception and transmission devices, to the controller unit 200, so that synchronous/asynchronous conversion of image data can be performed.

A scanner image processor 280 performs processing, such as correction, manipulation, and editing, on image data received from the scanner 270. In addition, the scanner image processor 280 determines, in accordance with a saturation signal of an image, whether the image data received from the scanner 270 is a color original or a monochrome original, and holds the determination result.

A printer image processor 290 performs processing, such as correction, manipulation, and editing, on image data to be output to the printer 295. An image rotator 230 performs, in cooperation with the scanner image processor 280, image rotation for the image data received from the scanner 270, and the image data that has been subjected to image rotation is stored in a memory. In addition, the image rotator 230 performs, in cooperation with the scanner image processor 280, image rotation for the image data stored in the memory, and the image data that has been subjected to image rotation is stored again in the memory. Furthermore, the image rotator 230 performs, in cooperation with the printer image processor 290, image rotation for the image data stored in the memory, and the image data that has been subjected to image rotation is output to the printer 295 via the apparatus I/F 220.

For example, an image compressor 240 performs, for multivalued image data, compression/decompression processing based on joint photographic experts group (JPEG). On the other hand, the image compressor 240 performs, for binary image data, compression/decompression based on joint bi-level image experts group (JBIG), modified modified read (MMR), modified read (MR), or modified Huffman (MH).

The image rotator 230 and the image compressor 240 are capable of operating in conjunction with each other. For example, in the case that image rotation and image compression are performed on image data stored in the memory, the image rotator 230 and the image compressor 240 are capable of performing such processing without referring to the memory.

An encryption/decryption processor 213 is a hardware accelerator board that performs encryption and decryption of data by using a predetermined key or the like.

Figure 3:
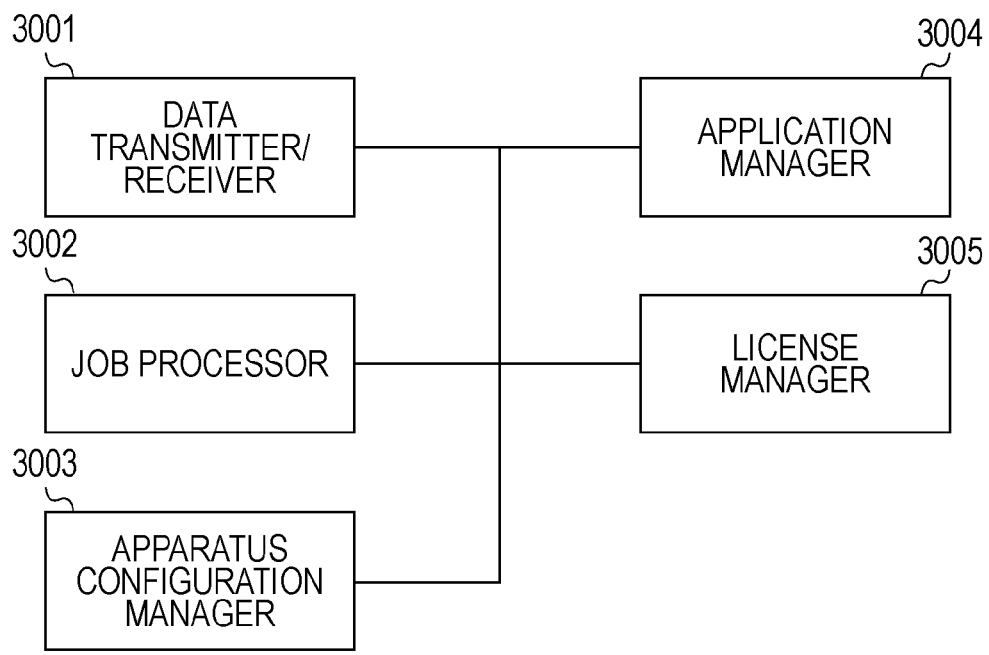
FIG. 3 is a block diagram showing an example of the software configuration of the multifunction apparatus.

FIG. 3 is a block diagram showing an example of the software configuration of each of the multifunction apparatuses 1001 and 1002. Referring to FIG. 3, a data transmitter/receiver 3001 receives a print job or the like that is required from an external apparatus, such as a client computer, and acquires data or the like from a memory card or the scanner 270. A job processor 3002 performs management and execution of various jobs, such as print jobs received by the data transmitter/receiver 3001, to be executed by the multifunction apparatuses 1001 and 1002. An apparatus configuration manager 3003 performs management of "apparatus configuration information" to be necessary for execution of a job. Depending on the contents of the job, the apparatus configuration manager 3003 may notify the job processor 3002 of "apparatus configuration information" used in the job.

An application manager 3004 performs management of an application program (hereinafter, also referred to as an application) to be used when the job processor 3002 executes a job. More specifically, the application manager 3004 performs management of an application and an application life cycle. For example, the application manager 3004 performs management of installation of application and license information, uninstallation of an application and license information, and starting and stopping of an application.

A license manager 3005 performs management of license information, such as the term of validity and the upper limit of the number of use times, set for each application. In addition, at the time of updating license information, the license manager 3005 performs generation of request code and at least one of encryption, decryption, analysis, and updating of license code.

Figure 4:
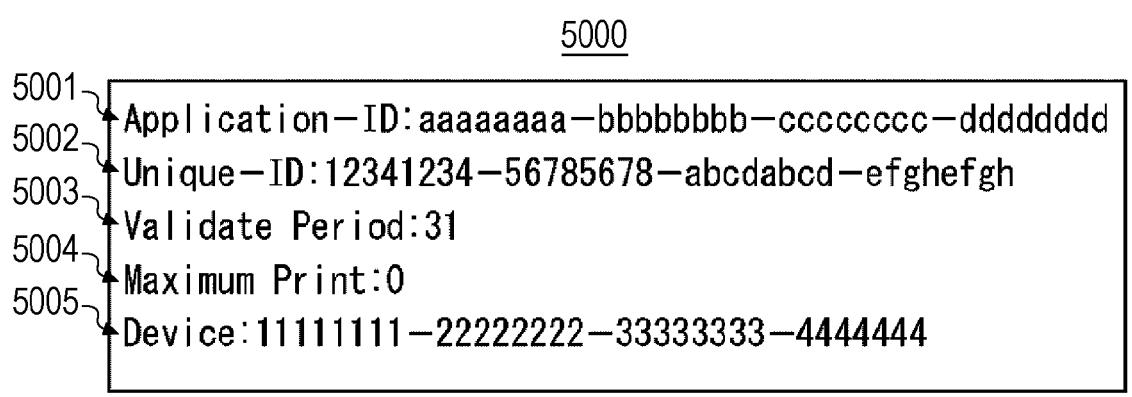
FIG. 4 illustrates an example of license information of an application.

FIG. 4 illustrates an example of license information of an application. License information 5000 shown in FIG. 4 is controlled by the license manager 3005. The license manager 3005 holds unique license information 5000 for each application.

Referring to FIG. 4, application identification information 5001 is information uniquely identifying an application. In this embodiment, an application is provided in advance with universal unique ID (UUID) as information that can uniquely identify the application. The same information as the UUID is represented as the application identification information 5001.

Application updating identification information 5002 is a unique ID to be uniquely allocated every time the license information 5000 is updated. In this embodiment, the UUID is used as the application updating identification information 5002. Term-of-validity information 5003 indicates the term of validity (validate period) in which an application provided with a license based on the license information 5000 can be used. In the example shown in FIG. 4, the license information 5000 indicates that the term of validity is 31 days.

Printing limit information 5004 indicates the maximum number of times that an application provided with a license based on the license information 5000 can perform printing. In this embodiment, since the term-of-validity information is designated, the printing limit information 5004 is not used. Apparatus identification information 5005 is information uniquely identifying the multifunction apparatus 1001. In this embodiment, the UUID is used as the apparatus identification information 5005.

Although an example in which the UUID is used as information uniquely identifying an application and an apparatus has been described in this embodiment, the information is not necessarily based on the UUID format as long as the information can uniquely identify an application and an apparatus. The license information 5000 may be based on a text format. Alternatively, the license information 5000 may be binary data or XML data. The format of the license information 5000 is not particularly limited. As described above, in this embodiment, right-of-use information indicating the right of use of an application can be implemented by the license information.

Figure 5:
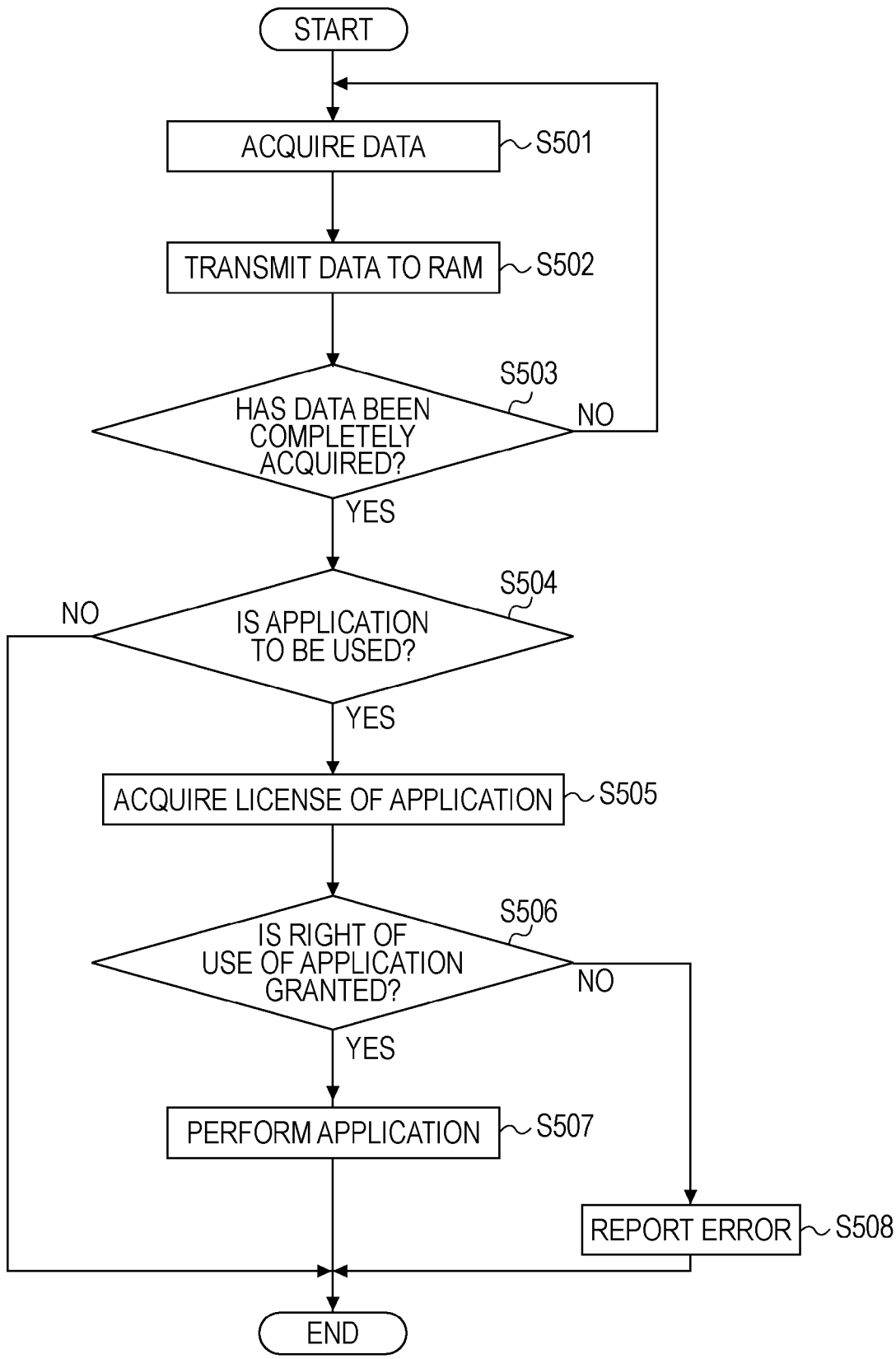
FIG. 5 is a flowchart showing an example of a process to be performed by the multifunction apparatus in a case where an application controlled on the basis of license information is performed.

An example of a process to be performed by the multifunction apparatus 1001 or 1002 in a case where an application controlled on the basis of license information is performed will be described with reference to a flowchart shown in FIG. 5.

In step S501, the data transmitter/receiver 3001 acquires data. The data transmitter/receiver 3001 may acquire data via the LAN 1006, via a memory card inserted into the removable media slot 211, or via the scanner 270. The type of data and the route through which data is acquired are not particularly limited.

In step S502, the data transmitter/receiver 3001 transmits the data acquired in step S501 to the RAM 202. In step S503, the data transmitter/receiver 3001 determines whether the data acquired in step S501 has been completely transmitted to the RAM 202. If it is determined in step S503 that the data acquired in step S501 has not been completely transmitted to the RAM 202, the processing of steps S501 to S503 are repeatedly performed until the data acquired in step S501 has been completely transmitted to the RAM 202.

If it is determined in step S503 that the data acquired in step S501 has been completely transmitted to the RAM 202, the process proceeds to step S504. In step S504, the job processor 3002 analyzes the data transmitted to the RAM 202 in step S502 and determines whether an application is to be used. If it is determined in step S504 that an application is not to be used, the process represented by the flowchart of FIG. 5 is terminated.

If it is determined in step S504 that an application is to be used, the process proceeds to step S505. In step S505, the job processor 3002 confirms via the application manager 3004 that the application exists, and acquires the license information 5000 via the license manager 3005.

In step S506, the job processor 3002 determines, in accordance with the license information 5000 acquired in step S505, whether the right of use of the application is granted to the multifunction apparatus 1001 or 1002. More specifically, for example, the job processor 3002 determines whether the number of times has not reached the upper limit (whether the number of times has not reached the maximum number of times that printing can be performed) and whether the term of validity has not been expired.

If it is determined in step S506 that the right of use of the application is granted to the multifunction apparatus 1001 or 1002, the process proceeds to step S507. In step S507, the job processor 3002 performs the application. Then, the process represented by the flowchart of FIG. 5 is terminated. If it is determined in step S506 that the right of use of the application is not granted to the multifunction apparatus 1001 or 1002, the process proceeds to step S508. In step S508, the job processor 3002 performs error processing for, for example, displaying on the operation unit 212 a message indicating that an error has occurred. Then, the process represented by the flowchart of FIG. 5 is terminated.

Figure 6:
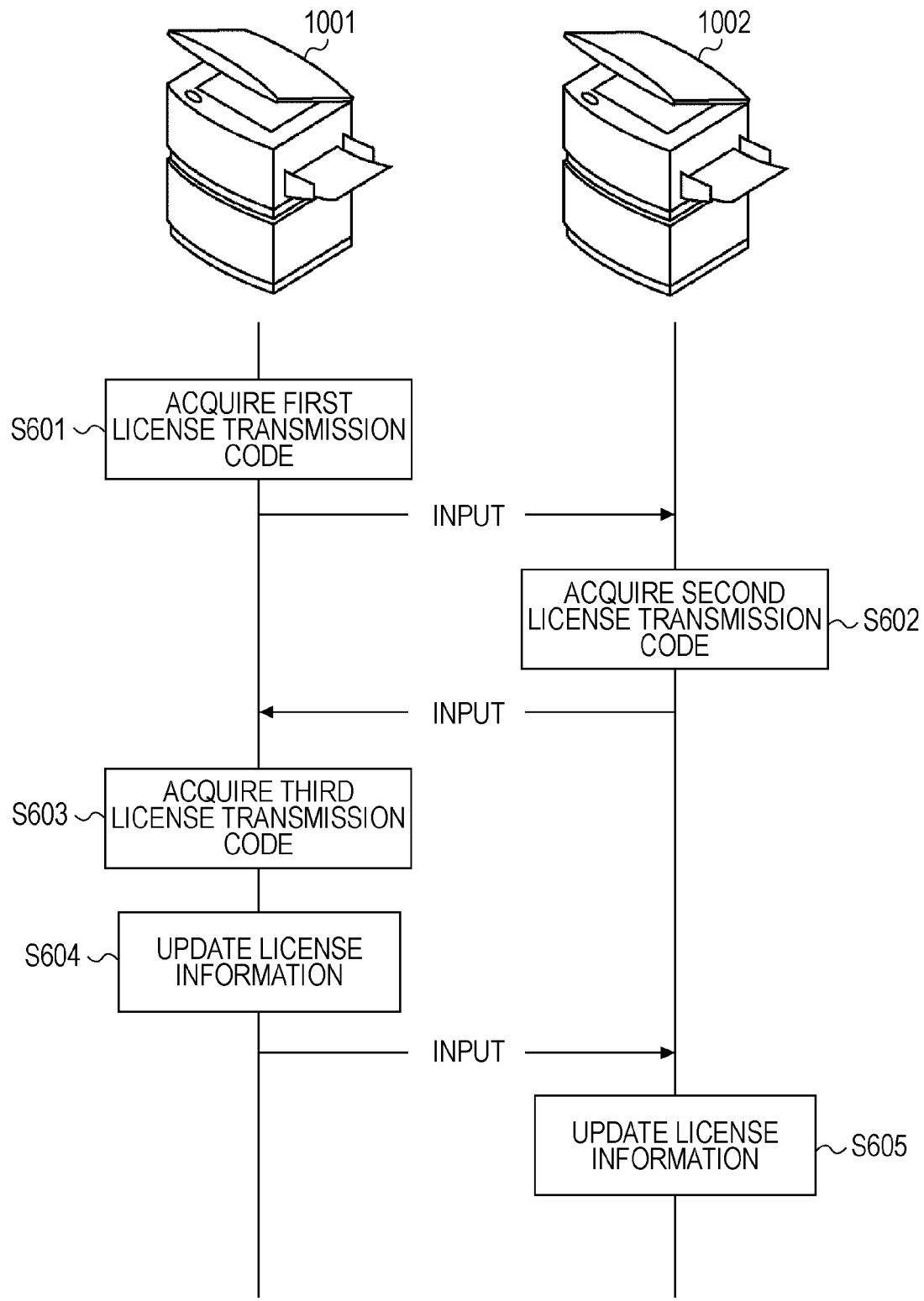
FIG. 6 illustrates an example of a process to be performed by multifunction apparatuses in a case where license information is transferred in a state where connection with a network is not established.

FIG. 6 illustrates a process to be performed by the multifunction apparatuses 1001 and 1002 in a case where transfer of license information is performed in a state where connection with a network is not established. In the description below, the license information 5000 is transferred from the multifunction apparatus 1001 to the multifunction apparatus 1002.

In step S601, the user selects, by using the operation unit 212 of the multifunction apparatus 1001 serving as a transmission source, an application whose license information 5000 is to be transferred. Then, a first license transmission code to be used for transmission of the license information 5000 is displayed on the operation unit 212 of the multifunction apparatus 1001. Accordingly, the user acquires the first license transmission code.

In step S602, the first license transmission code displayed on the multifunction apparatus 1001 in step S601 is input to the multifunction apparatus 1002 serving as a transmission destination in accordance with an operation performed by the user using the operation unit 212 of the multifunction apparatus 1002. The multifunction apparatus 1002 verifies that the application selected in step S601 exists in the multifunction apparatus 1002. Then, a second license transmission code is displayed on the operation unit 212 of the multifunction apparatus 1002. Accordingly, the user acquires the second license transmission code.

In step S603, the second license transmission code displayed on the multifunction apparatus 1002 in step S602 is input to the multifunction apparatus 1001 in accordance with an operation performed by the user using the operation unit 212 of the multifunction apparatus 1001. The multifunction apparatus 1001 verifies that the received second license transmission code is valid. Then, the multifunction apparatus 1001 urges the user to designate the number of times or the term of validity of the license information 5000 to be transferred. The multifunction apparatus 1001 generates a third license transmission code on the basis of the designated number of times or term of validity, and the generated third license transmission code is displayed on the operation unit 212 of the multifunction apparatus 1001. Accordingly, the user acquires the third license transmission code.

In step S604, the multifunction apparatus 1001 performs subtraction of the number of times or the term of validity of the application designated in step S603 from the current number of times or the current term of validity of the license information 5000 of the application selected in step S601. Accordingly, the license information 5000 of the application selected in step S601 in the multifunction apparatus 1001 is updated.

In step S605, the third license transmission code displayed on the multifunction apparatus 1001 in step S603 is input to the multifunction apparatus 1002 in accordance with an operation performed by the user using the operation unit 212 of the multifunction apparatus 1002. The multifunction apparatus 1002 verifies that the received third license transmission code is valid. Then, the multifunction apparatus 1002 performs addition of the number of times or the term of validity of the license information 5000 of the application in accordance with the contents described in the received third license transmission code. Accordingly, the license information 5000 of the application selected in step S601 in the multifunction apparatus 1002 is updated. As described above, in this embodiment, information processing apparatuses (a first information processing apparatus and a second information processing apparatus) can be implemented by the multifunction apparatuses 1001 and 1002.

Figure 7:
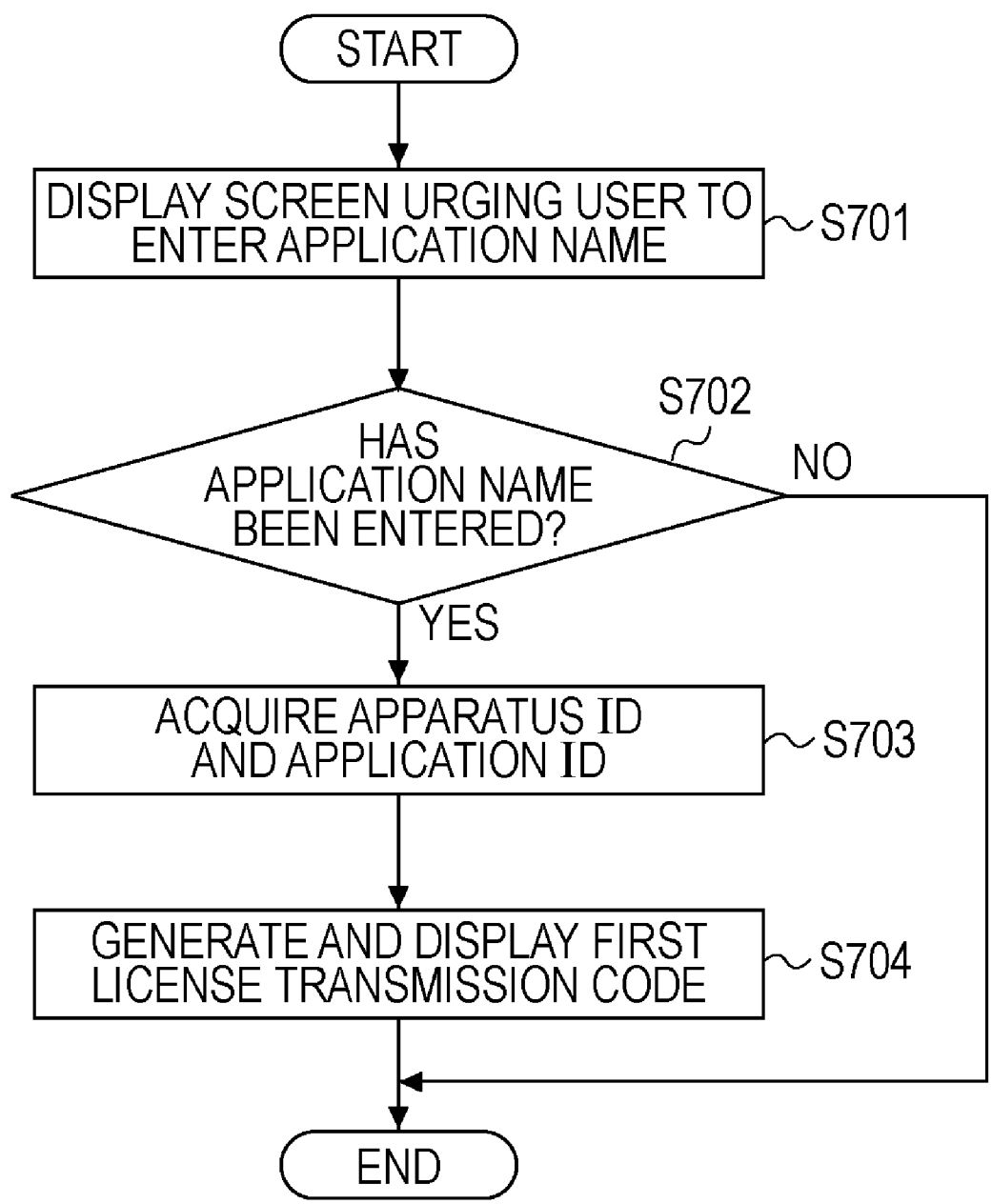
FIG. 7 is a flowchart showing an example of a process to be performed by a multifunction apparatus serving as a transmission source to allow a user to acquire a first license transmission code.
Figure 8:
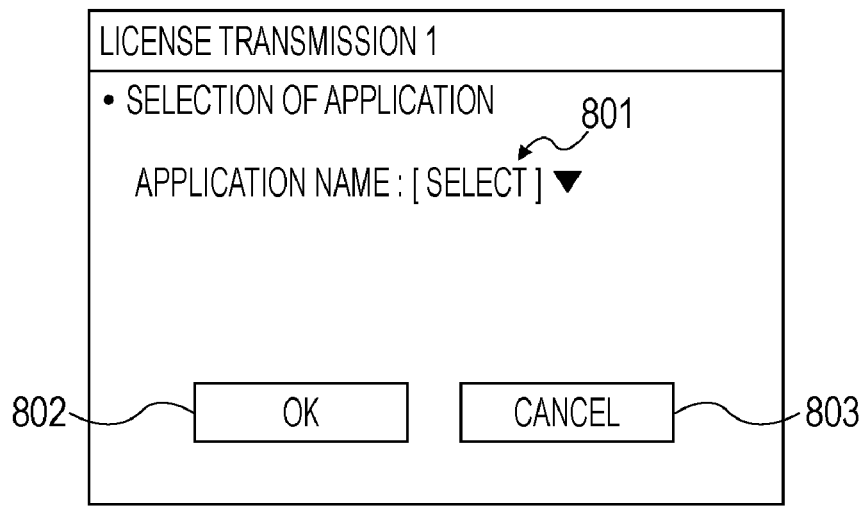
FIG. 8 illustrates an example of a display screen urging the user to select an application whose license information is to be transferred.
Figure 9:
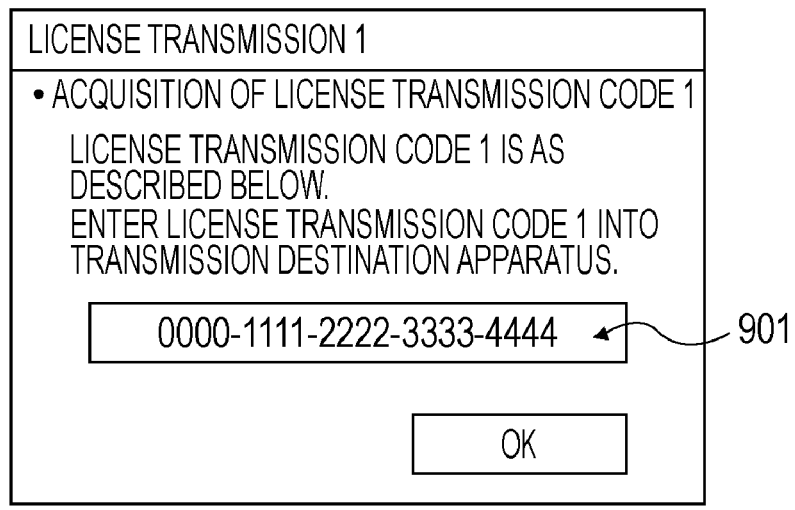
FIG. 9 illustrates an example of a display screen on which the first license transmission code is displayed.

An example of a process to be performed by the multifunction apparatus 1001 to allow the user to acquire a first license transmission code will be described with reference to FIGS. 7 to 9. A process to transfer license information to be performed in a state where connection with a network is not established (a process to acquire a first license transmission code) will be described. FIG. 7 is a flowchart showing an example of a process to be performed by the multifunction apparatus 1001 to allow the user to acquire a first license transmission code. FIG. 8 illustrates an example of a display screen urging the user to select an application whose license information is to be transferred. FIG. 9 illustrates an example of a display screen on which a first license transmission code is displayed.

In step S701, when the user issues an instruction to acquire a first license transmission code by using the operation unit 212 of the multifunction apparatus 1001, the job processor 3002 displays a display screen 800 shown in FIG. 8 on the operation unit 212 and urges the user to enter an application name. In step S702, after an application name is entered in an application name entry field 801 on the display screen 800, the job processor 3002 determines whether an OK button 802 is selected or a cancel button 803 is selected. If it is determined that the cancel button 803 is selected, the process represented by the flowchart of FIG. 7 is terminated. If it is determined that an application name is entered in the application name entry field 801, the process proceeds to step S703.

In step S703, the job processor 3002 acquires, from the application manager 3004, an application ID uniquely identifying an application corresponding to the entered application name. The job processor 3002 also acquires, from the apparatus configuration manager 3003, an apparatus ID uniquely identifying the multifunction apparatus 1001. In step S704, on the basis of the acquired application ID and apparatus ID, the job processor 3002 generates a first license transmission code that is capable of identifying the application ID and the apparatus ID, and a display screen 900 shown in FIG. 9 is displayed on the operation unit 212. On the display screen 900 shown in FIG. 9, the generated first license transmission code is displayed in a code display field 901.

As described above, in this embodiment, a first code can be implemented by the first license transmission code, application identification information can be implemented by the application ID, and apparatus identification information can be implemented by the apparatus ID. Furthermore, a first generation unit and a first transmission unit can be implemented by the execution of the processing of step S704.

Although the first license transmission code is not necessarily encrypted, a second license transmission code and a third license transmission code, which will be generated later, must be encrypted in order to prevent the second license transmission code and the third license transmission code from being tampered with. However, the first license transmission code may also be encrypted. Encryption can be achieved using a known method. Since an encryption method is not important for a transfer process for the license information 5000, the description of the encryption method will not be further described.

Figure 10:
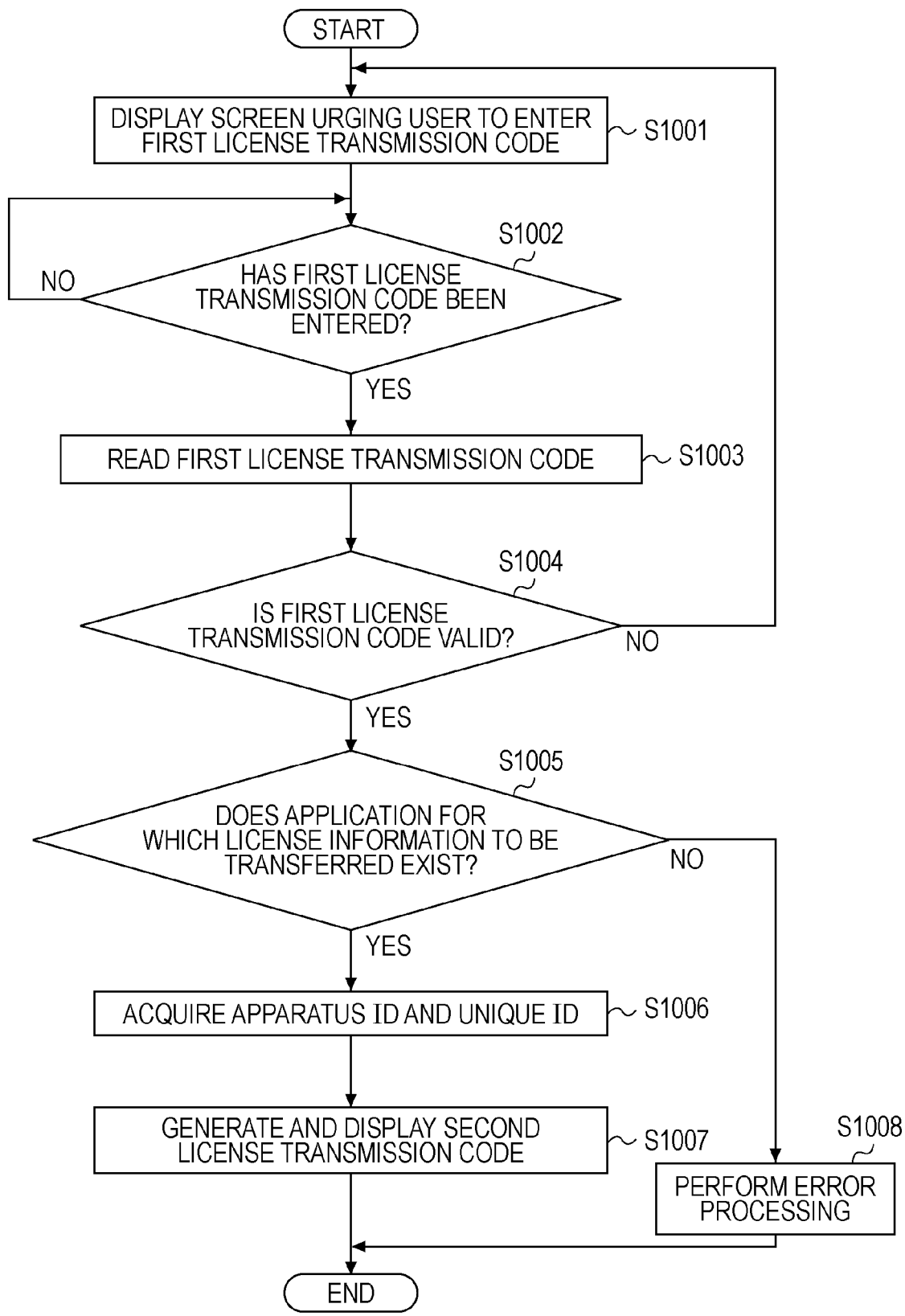
FIG. 10 is a flowchart showing an example of a process to be performed by a multifunction apparatus serving as a transmission destination to allow the user to acquire a second license transmission code.
Figure 11:
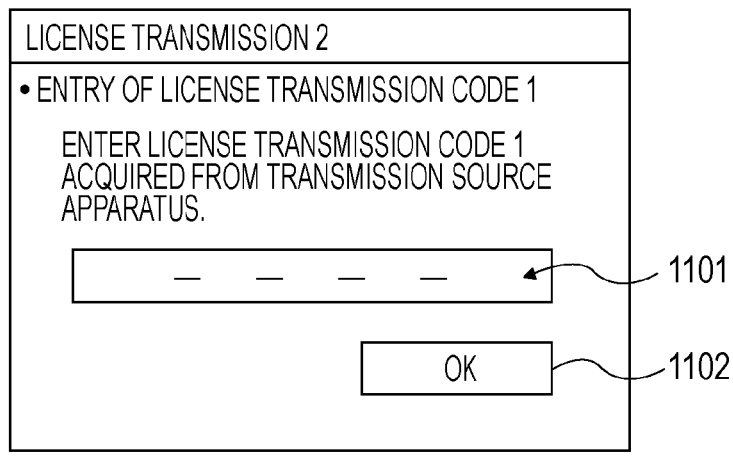
FIG. 11 illustrates an example of a display screen urging the user to enter the first license transmission code.
Figure 12:
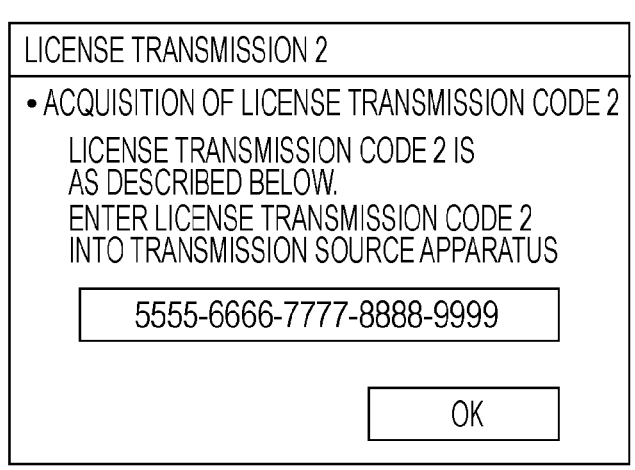
FIG. 12 illustrates an example of a display screen on which the second license transmission code is displayed.
Figure 13:
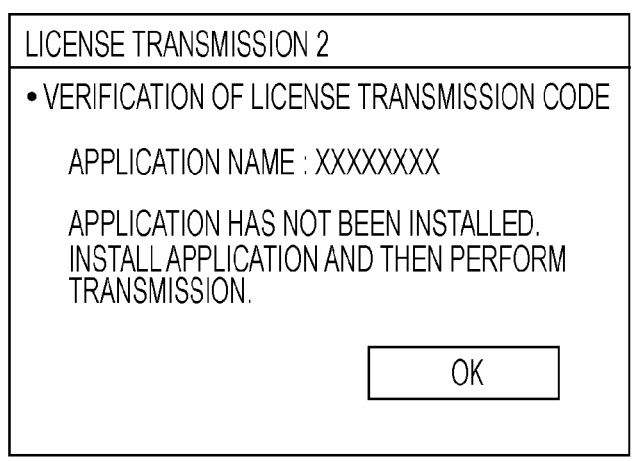
FIG. 13 illustrates an example of a display screen to be displayed in a case where an application corresponding to the first license transmission code has not been installed in the multifunction apparatus serving as the transmission destination.

An example of a process to be performed by the multifunction apparatus 1002 to allow the user to acquire a second license transmission code will be described with reference to FIGS. 10 to 13. A process to transfer license information to be performed in a state where connection with a network is not established (a process to acquire a second license transmission code) will be described. FIG. 10 is a flowchart showing an example of a process to be performed by the multifunction apparatus 1002 to allow the user to acquire a second license transmission code. FIG. 11 illustrates an example of a display screen urging the user to enter a first license transmission code. FIG. 12 illustrates an example of a display screen on which a second license transmission code is displayed. FIG. 13 illustrates an example of a display screen to be displayed in a case where an application corresponding to a first license transmission code has not been installed in a multifunction apparatus serving as a transmission destination.

In step S1001, when the user issues an instruction to acquire a second license transmission code by using the operation unit 212 of the multifunction apparatus 1002, the job processor 3002 displays a display screen 1100 shown in FIG. 11 on the operation unit 212. Accordingly, the user is urged to enter a first license transmission code.

In step S1002, after the first license transmission code is entered in a first license transmission code entry field 1101 on the display screen 1100, the job processor 3002 waits until an OK button 1102 is selected.

If the first license transmission code is entered in the first license transmission code entry field 1101 and the OK button 1102 is selected, the process proceeds to step S1003. In step S1003, the job processor 3002 reads the received first license transmission code.

As described above, in this embodiment, a first reception unit can be implemented by the execution of the processing of steps S1001 and S1002.

In step S1004, on the basis of the result obtained by the reading in step S1003, the job processor 3002 determines whether the received first license transmission code is valid by checking if the entered data contains no mistakes. If it is determined in step S1004 that the received first license transmission code is invalid, the process returns to step S1001.

If it is determined in step S1004 that the received first license transmission code is valid, the process proceeds to step S1005. In step S1005, the application manager 3004 determines, in accordance with the contents of the received first license transmission code, whether the application for which the license information 5000 is to be transferred has been installed in the multifunction apparatus 1002. If it is determined in step S1005 that the application for which the license information 5000 is to be transferred has not been installed in the multifunction apparatus 1002, the process proceeds to step S1008. In step S1008, the job processor 3002 displays a display screen 1300 shown in FIG. 13 on the operation unit 212 and urges the user to install the application into the multifunction apparatus 1002. Then, the process represented by the flowchart of FIG. 10 is terminated.

If it is determined in step S1005 that the application for which the license information 5000 is to be transferred has been installed in the multifunction apparatus 1002, the process proceeds to step S1006. In step S1006, the job processor 3002 acquires, from the apparatus configuration manager 3003, an apparatus ID uniquely identifying the multifunction apparatus 1002 and a unique ID.

In step S1007, on the basis of the first license transmission code read in step S1003 and the apparatus ID and the unique ID acquired in step S1006, the job processor 3002 generates a second license transmission code that is capable of identifying the first license transmission code, the apparatus ID, and the unique ID. Here, the second license transmission code is encrypted. Then, the job processor 3002 displays on the operation unit 212 a display screen 1200 on which the generated second license transmission code is displayed (see FIG. 12).

As described above, in this embodiment, apparatus identification information can be implemented by the apparatus ID, and a second code can be implemented by the second license transmission code. Furthermore, a first generation unit and a first transmission unit can be implemented by the execution of the processing of step S1007.

Figure 14:
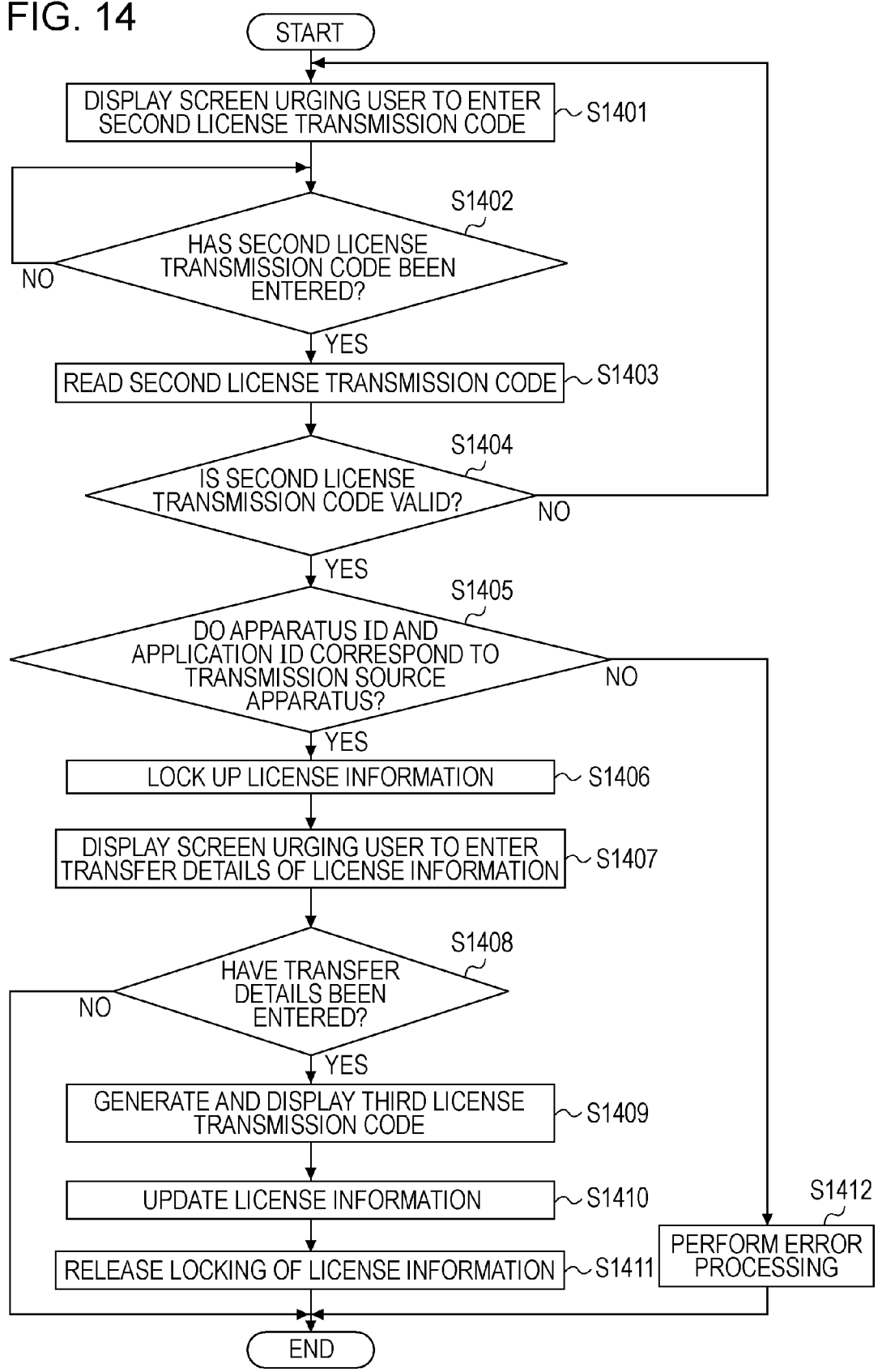
FIG. 14 is a flowchart showing an example of a process to be performed by the multifunction apparatus serving as the transmission source to allow the user to acquire the third license transmission code.
Figure 15:
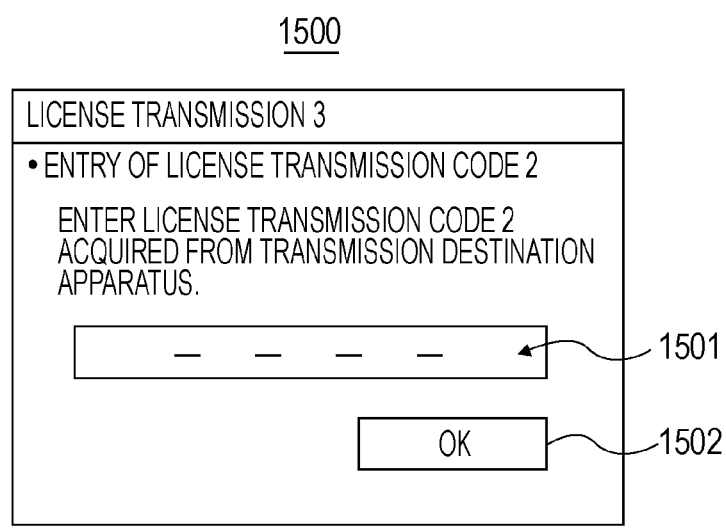
FIG. 15 illustrates an example of a display screen urging the user to enter the second license transmission code.
Figure 16:
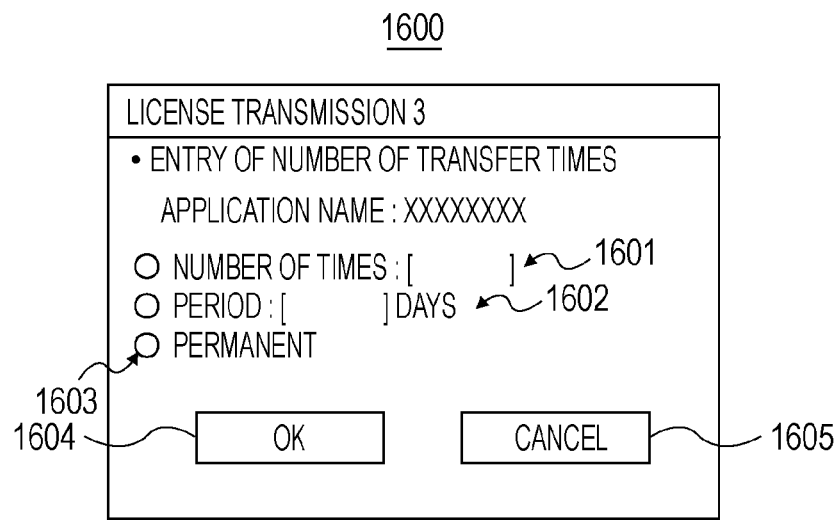
FIG. 16 illustrates an example of a display screen urging the user to designate the number of times and the term of validity of the license information to be transferred (transfer details of the license information).
Figure 17:
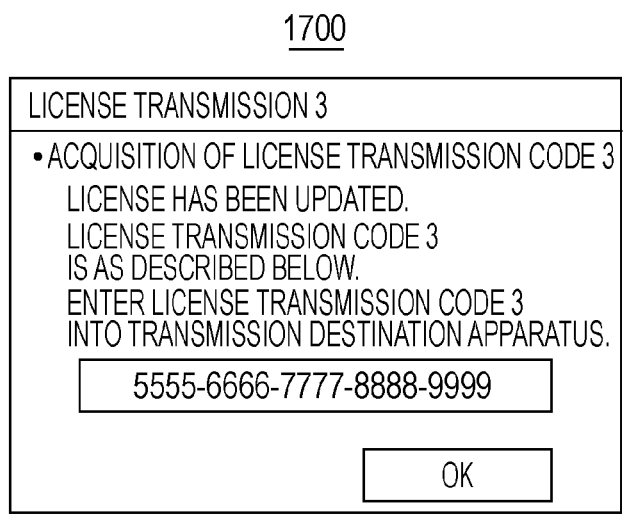
FIG. 17 illustrates an example of a display screen on which the third license transmission code is displayed.

An example of a process to be performed by the multifunction apparatus 1001 to allow the user to acquire a third license transmission code will be described with reference to FIGS. 14 to 17. A process to transfer license information to be performed in a state where connection with a network is not established (a process to acquire a third license transmission code) will be described. FIG. 14 is a flowchart showing an example of a process to be performed by the multifunction apparatus 1001 to allow the user to acquire a third license transmission code. FIG. 15 illustrates an example of a display screen urging the user to enter a second license transmission code. FIG. 16 illustrates an example of a display screen urging the user to designate the number of times or the term of validity of the license information 5000 to be transferred (transfer details of the license information 5000). FIG. 17 illustrates an example of a display screen on which a third license transmission code is displayed.

In step S1401, when the user issues an instruction to acquire a third license transmission code by using the operation unit 212 of the multifunction apparatus 1001, the job processor 3002 displays a display screen 1500 shown in FIG. 15 on the operation unit 212. Accordingly, the user is urged to enter a second license transmission code. In step S1402, after the second license transmission code is entered in a second license transmission code entry field 1501 on the display screen 1500, the job processor 3002 waits until an OK button 1502 is selected.

If the second license transmission code is entered in the second license transmission code entry field 1501 and the OK button 1502 is selected, the process proceeds to step S1403. In step S1403, the job processor 3002 reads (for example, decrypts) the received second license transmission code. As described above, in this embodiment, a first reception unit can be implemented by the execution of the processing of steps S1401 and S1402. In step S1404, on the basis of the result obtained by the reading in step S1403, the job processor 3002 determines whether the received second license transmission code is valid by checking if the entered data contains no mistakes. If it is determined in step S1404 that the received second license transmission code is invalid, the process returns to step S1401.

If it is determined in step S1404 that the received second license transmission code is valid, the process proceeds to step S1405. In step S1405, the job processor 3002 determines, on the basis of the contents of the received second license transmission code, whether an apparatus ID of a transmission source apparatus and an application ID correspond to the multifunction apparatus 1001. If it is determined in step S1405 that the apparatus ID of the transmission source apparatus and the application ID do not correspond to the multifunction apparatus 1001, the received second license transmission code is determined to be a code for an apparatus, which is not the multifunction apparatus 1001, or a code that has been tampered with. Thus, the process proceeds to step S1412. In step S1412, the job processor 3002 performs error processing for, for example, displaying on the operation unit 212 a message indicating that an error has occurred. Then, the process represented by the flowchart of FIG. 14 is terminated. As described above, in this embodiment, a determination unit can be implemented by the execution of the processing of step S1405.

If it is determined in step S1405 that the apparatus ID of the transmission source apparatus and the application ID correspond to the multifunction apparatus 1001, the process proceeds to step S1406. In step S1406, the application manager 3004 locks up the license information 5000 so that the application whose license information 5000 is to be transferred cannot be used and the number of times cannot be changed. As described above, in this embodiment, an inhibition unit can be implemented by the execution of the processing of step S1406.

In step S1407, the job processor 3002 displays a display screen 1600 shown in FIG. 16 on the operation unit 212 and urges the user to enter the number of times or the term of validity of the license information 5000 to be transferred.

In step S1408, the job processor 3002 determines whether the transfer details of the license information 5000 are entered on the display screen 1600. More specifically, after any of the number of times, the term of validity (period), permanent (no limit) is selected using a radio button 1603, the job processor 3002 determines whether an OK button 1604 is selected or a cancel button 1605 is selected. Here, in the case that the number of times (or the period)) is selected, after a value is entered in a number-of-times entry field 1601 (or a period entry field 1602), the job processor 3002 determines whether the OK button 1604 is selected.

If it is determined that the cancel button 1605 is selected and the transfer details of the license information 5000 are not entered on the display screen 1600, the process represented by the flowchart of FIG. 14 is terminated.

In contrast, if the OK button 1604 is selected as described above and the transfer details of the license information 5000 are entered on the display screen 1600, the process proceeds to step S1409. In step S1409, on the basis of the contents of the second license transmission code read in step S1403 and the contents entered in step S1407, the job processor 3002 generates a third license transmission code that is capable of identifying the contents of the second license transmission code and the contents entered in step S1407. Here, the third license transmission code is encrypted. Then, the job processor 3002 displays on the operation unit 212 a display screen 1700 on which the generated third license transmission code is displayed (see FIG. 17).

As described above, in this embodiment, transfer detail information can be implemented by the information set on the display screen 1600. Furthermore, a second reception unit can be implemented by the execution of the processing of steps S1407 and S1408. In addition, in this embodiment, a third code can be implemented by the third license transmission code, and a second generation unit and a second transmission unit can be implemented by the execution of the processing of step S1409.

In step S1410, the license manager 3005 performs subtraction of the number of times (or the term of validity) entered in step S1407 from the number of times (or the term of validity) of the license information 5000 to be transferred. Accordingly the license information 5000 of the application designated by the user in step S701 shown in FIG. 7 in the multifunction apparatus 1001 is updated. As described above, in this embodiment, an updating unit can be implemented by the execution of the processing of step S1410.

In step S1411, the job processor 3002 unlocks the license information 5000 that has been locked in step S1406. As described above, in this embodiment, a release unit can be implemented by the execution of the processing of step S1411.

Figure 18:
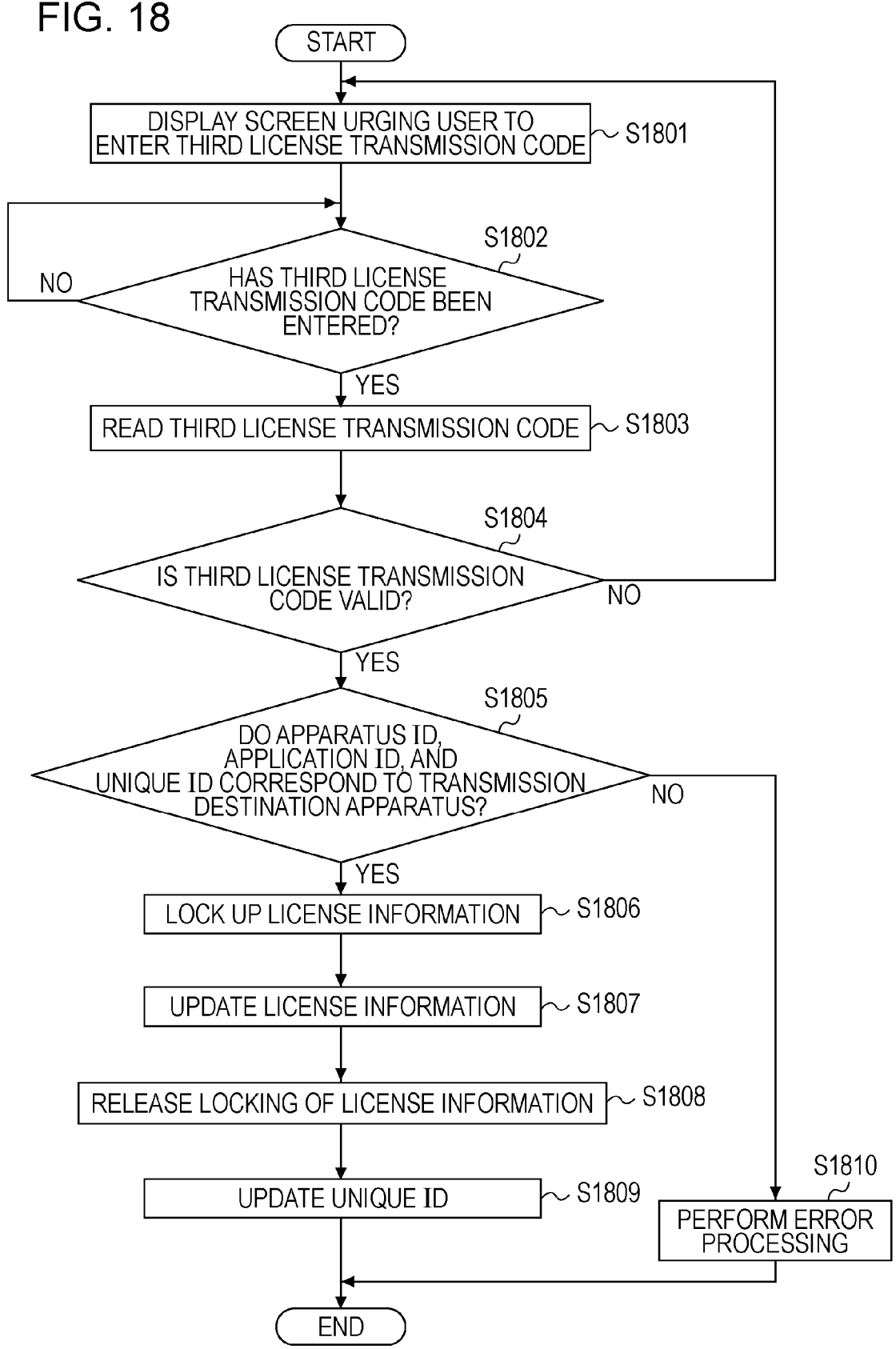
FIG. 18 is a flowchart showing an example of a process to be performed by the multifunction apparatus serving as the transmission destination to update license information.
Figure 19:
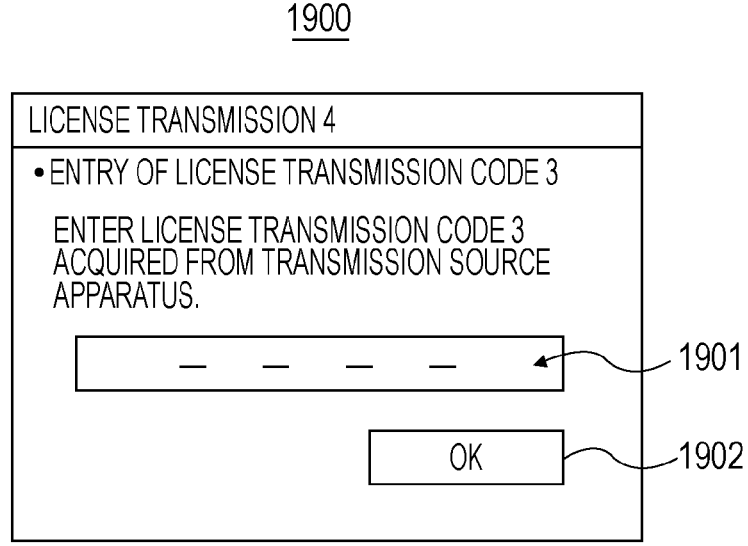
FIG. 19 illustrates an example of a display screen urging the user to enter the third license transmission code.
Figure 20:
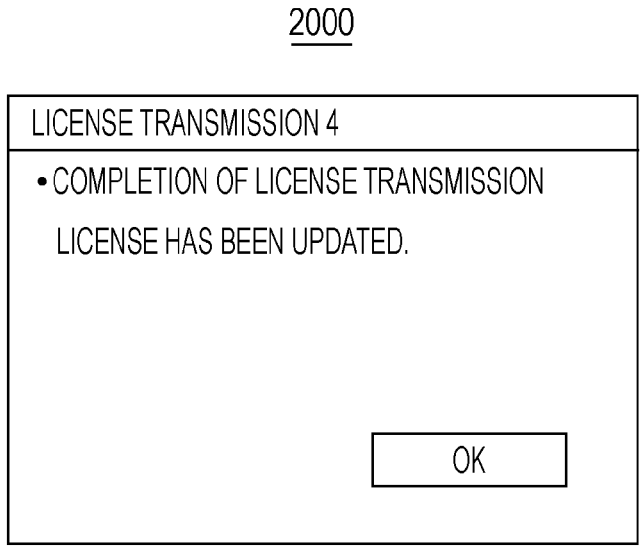
FIG. 20 illustrates an example of a display screen notifying the user of completion of updating of the license information.

An example of a process to be performed by the multifunction apparatus 1002 to update license information will be described with reference to FIGS. 18 to 20. A process to transfer license information to be performed in a state where connection with a network is not established (a process to update license information in a transmission destination multifunction apparatus) will be described. FIG. 18 is a flowchart showing an example of a process to be performed by the multifunction apparatus 1002 to update license information. FIG. 19 illustrates an example of a display screen urging the user to enter a third license transmission code. FIG. 20 illustrates an example of a display screen notifying the user of the completion of updating of the license information 5000.

In step S1801, when the user issues an instruction to update the license information 5000 by using the operation unit 212 of the multifunction apparatus 1002, the job processor 3002 displays a display screen 1900 shown in FIG. 19 on the operation unit 212. Accordingly, the user is urged to enter a third license transmission code. In step S1802, after the third license transmission code is entered in a third license transmission code entry field 1901 on the display screen 1900, the job processor 3002 waits until an OK button 1902 is selected.

If the third license transmission code is entered in the third license transmission code entry field 1901 and the OK button 1902 is selected, the process proceeds to step S1803. In step S1803, the job processor 3002 reads (for example, decrypts) the received third license transmission code. As described above, in this embodiment, a second reception unit can be implemented by the execution of the processing of steps S1801 and S1802. In step S1804, on the basis of the result obtained by the reading in step S1803, the job processor 3002 determines whether the received third license transmission code is valid by checking if the entered data contains no mistakes. If it is determined in step S1804 that the received third license transmission code is invalid, the process returns to step S1801.

If it is determined in step S1804 that the received third license transmission code is valid, the process proceeds to step S1805. In step S1805, the job processor 3002 determines, on the basis of the contents of the received third license transmission code, whether an apparatus ID of a transmission destination apparatus, an application ID, and a unique ID correspond to the multifunction apparatus 1002. If it is determined in step S1805 that the apparatus ID of the transmission destination apparatus, the application ID, and the unique ID do not correspond to the multifunction apparatus 1002, the received third license transmission code is determined to be a code for an apparatus, which is not the multifunction apparatus 1002, or a code that has been tampered with. Thus, the process proceeds to step S1810. In step S1810, the job processor 3002 performs error processing for, for example, displaying on the operation unit 212 a message indicating that an error has occurred. Then, the process represented by the flowchart of FIG. 18 is terminated. As described above, in this embodiment, a determination unit can be implemented by the execution of the processing of step S1805.

If it is determined in step S1805 that the apparatus ID of the transmission destination apparatus, the application ID, and the unique ID correspond to the multifunction apparatus 1002, the process proceeds to step S1806. In step S1806, the application manager 3004 locks up the license information 5000 so that the application whose license information 5000 is to be accepted cannot be used and the number of times cannot be changed. As described above, in this embodiment, an inhibition unit can be implemented by the execution of the processing of step S1806.

In step S1807, the license manager 3005 reads the license information 5000 to be accepted, and performs addition of the number of times (the term of validity) of the license information 5000 on the basis of the contents of the third license transmission code read in step S1803. Accordingly, the license information 5000 of the application designated by the user in step S701 shown in FIG. 7 in the multifunction apparatus 1002 is updated. As described above, in this embodiment, an updating unit can be implemented by the execution of the processing of step S1807.

In step S1808, the job processor 3002 unlocks the license information 5000 that has been locked in step S1806. As described above, in this embodiment, a release unit can be implemented by the execution of the processing of step S1808.

In step S1809, the apparatus configuration manager 3003 updates the unique ID. The job processor 3002 displays a display screen 2000 shown in FIG. 20 on the operation unit 212 that notifies the user of the completion of updating of the license information 5000.

As described above, in this embodiment, when an application whose license information is to be transferred is designated, the multifunction apparatus 1001 generates a first license transmission code on the basis of an application ID of the application and an apparatus ID of the multifunction apparatus 1001. Then, the generated first license transmission code is reported to the user. The user enters the first license transmission code into the multifunction apparatus 1002. In the case that the first license transmission code is valid, the multifunction apparatus 1002 generates a second license transmission code on the basis of the first license transmission code, an apparatus ID of the multifunction apparatus 1002, and a unique ID, and reports the generated second license transmission code to the user. The user enters the second license transmission code into the multifunction apparatus 1001. In the case that the second license transmission code is valid, the user enters transfer details into the multifunction apparatus 1001. The multifunction apparatus 1001 generates a third license transmission code on the basis of the second license transmission code and the received transfer details, and reports the generated third license transmission code to the user. The multifunction apparatus 1001 updates license information in the multifunction apparatus 1001 in accordance with the received transfer details. Then, the user enters the third license transmission code into the multifunction apparatus 1002. In the case that the third license transmission code is valid, the multifunction apparatus 1002 updates license information in the multifunction apparatus 1002 on the basis of the third license transmission code. Thus, in the exchange of multifunction apparatuses, limitation and invalidation of a license of an application (optional feature) used in an old multifunction apparatus (the multifunction apparatus 1001) can be ensured, and transfer of the license of the application from the old multifunction apparatus to the new multifunction apparatus can be ensured. Accordingly, license information of an application in a transmission source apparatus can be reliably transferred to a transmission destination apparatus without using a dedicated server.

Another exemplary embodiment of the present invention will now be described. In the above-described embodiment, an example in which the license information 5000 is transferred offline (in a state where connection with a network is not established) has been explained. In contrast, in this embodiment, an example in which the license information 5000 is transferred online (in a state where connection with the network is established) will be described. As described above, a main difference between the above-described embodiment and the present embodiment is that processing is performed offline in the above-described embodiment, whereas processing is performed online in the present embodiment. Accordingly, the same parts as in the above-described embodiment will be represented by the reference numerals used in FIGS. 1 to 20 and the descriptions of those same parts will not be repeated.

Figure 21:
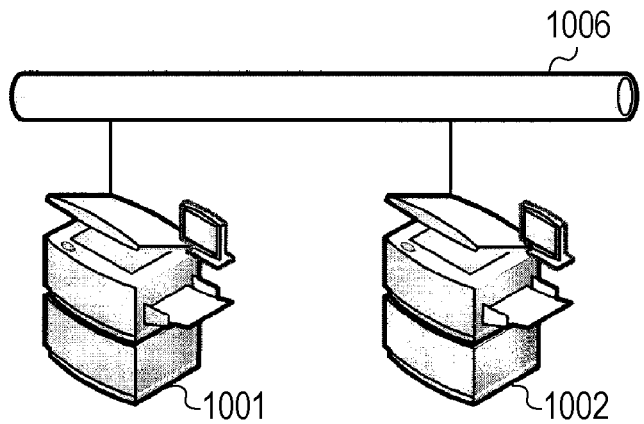
FIG. 21 illustrates an example of the configuration of a license transmission system according to another exemplary embodiment of the present invention.

FIG. 21 shows an example of the configuration of a license transmission system. Referring to FIG. 21, in the case of transferring license information, the multifunction apparatuses 1001 and 1002 are connected to a network, such as the LAN 1006, so that the multifunction apparatuses 1001 and 1002 can communicate with each other. In this embodiment, an example in which the license information 5000 is transferred from the multifunction apparatus 1001 to the multifunction apparatus 1002 will be described.

Concerning a process to transfer the license information 5000 to be performed in a case where the multifunction apparatuses 1001 and 1002 are connected with each other via the LAN 1006, except for entry of the first to third license transmission codes, the same process as shown in FIG. 6 is performed. That is, although the first to third license transmission codes are entered (acquired) in accordance with operations performed by the user in the embodiment described above, the first to third license transmission codes are transmitted and received through communication via a network (the LAN 1006) in this embodiment.

Figure 22B:
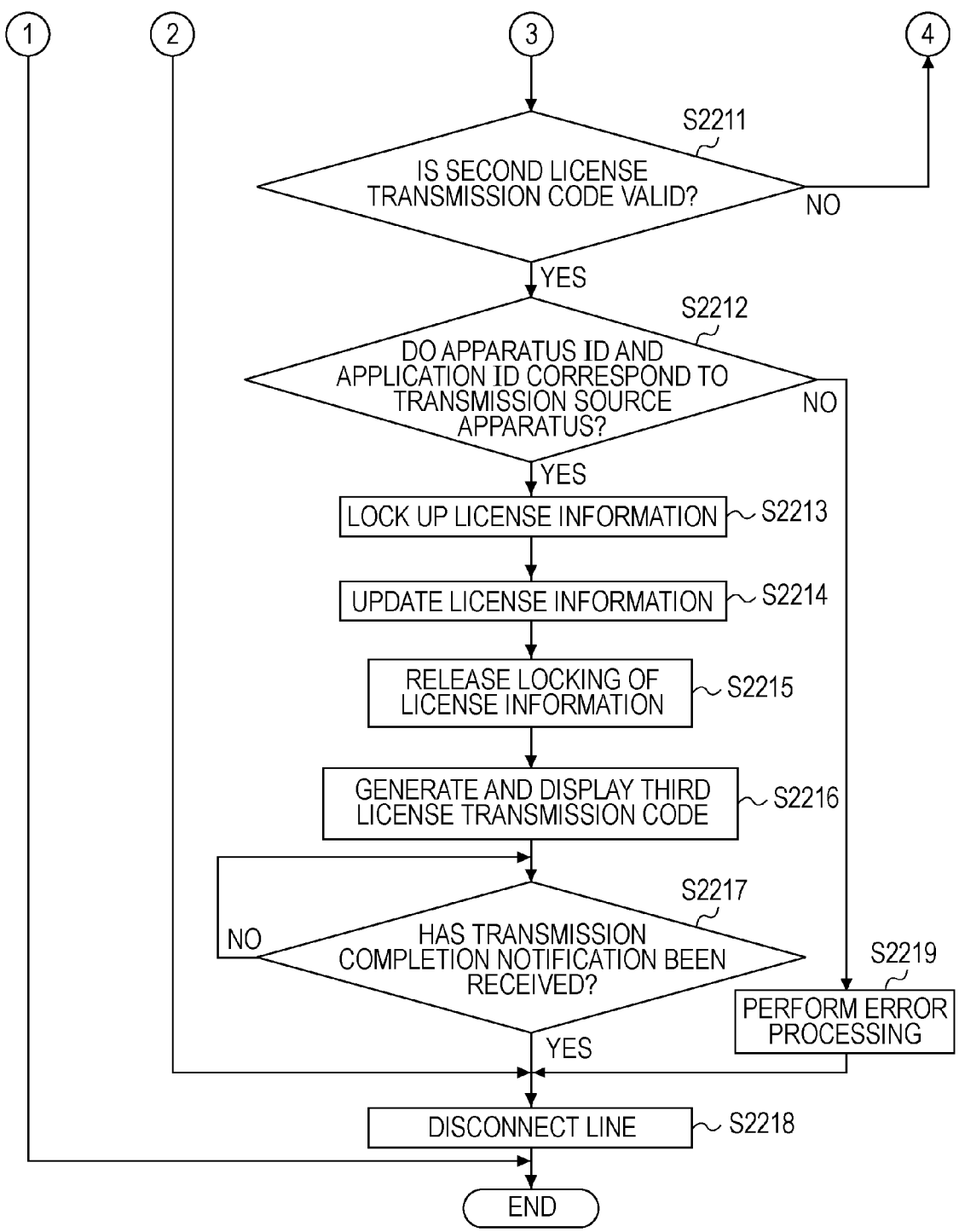
FIG. 22 is a flowchart showing an example of a process to be performed by a multifunction apparatus serving as a transmission source to transfer license information.
Figure 23:
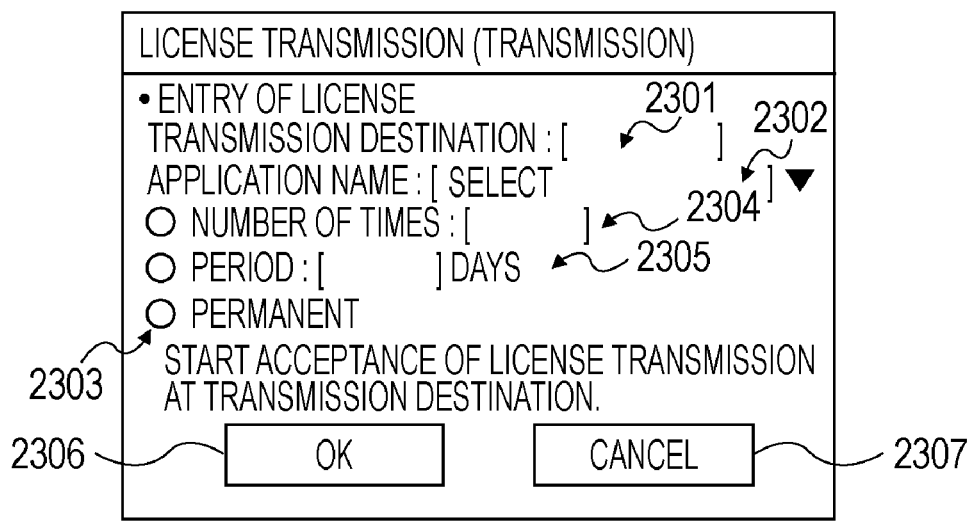
FIG. 23 illustrates an example of a display screen urging the user to set the license information to be transferred.
Figure 24:
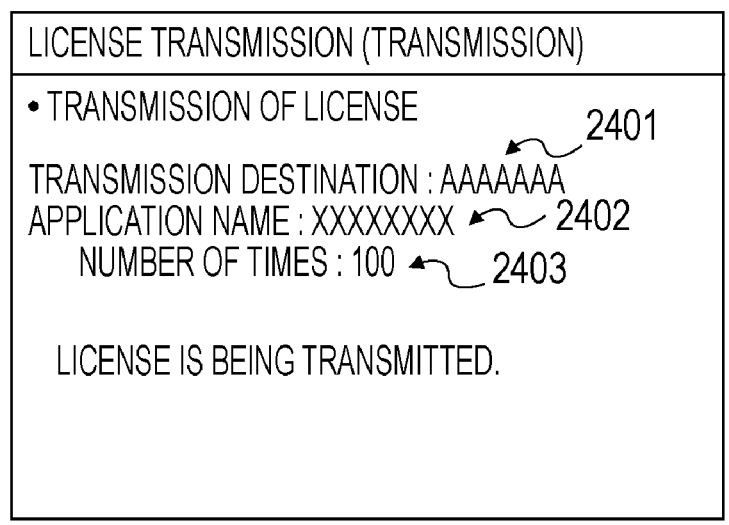
FIG. 24 illustrates an example of a display screen to be displayed when the license information is being transmitted.

An example of a process to be performed by the multifunction apparatus 1001 in a case where license information is transferred in a state where connection with a network is established will be described with reference to FIGS. 22 to 26. FIG. 22 is a flowchart showing an example of a process to be performed by the multifunction apparatus 1001 to transfer license information. FIG. 23 illustrates an example of a display screen urging the user to set license information to be transferred. FIG. 24 illustrates an example of a display screen to be displayed when license information is being transmitted. FIG. 25 illustrates an example of a display screen to be displayed when transmission of license information is completed. FIG. 26 illustrates an example of a display screen to be displayed when transmission of license information is canceled.

In step S2201, when the user issues an instruction to transmit license information via the network by using the operation unit 212 of the multifunction apparatus 1001, the job processor 3002 displays a display screen 2300 shown in FIG. 23 on the operation unit 212. Accordingly, the user is urged to enter information necessary for transmission of the license information 5000. More specifically, a transmission destination of the license information 5000 is entered in a transmission destination entry field 2301 on the display screen 2300 shown in FIG. 23. In this embodiment, information indicating the multifunction apparatus 1002 is entered in the transmission destination entry field 2301. The application name of the object to be transferred is entered or selected in an application name entry field 2302. Then, the number of times (the maximum number of times that printing can be performed), the term of validity (period), or permanent (no limit) is selected using a radio button 2303. Then, in the case that the number of times (or the term of validity) is selected, a value is entered in a number-of-times entry field 2304 (or a period entry field 2305). As described above, in this embodiment, transfer detail information can be implemented by the information set on the display screen 2300, and a second reception unit can be implemented by the execution of the processing of step S2201.

In step S2202, after information necessary for transmission of the license information 5000 is entered, the job processor 3002 determines whether an OK button 2306 is selected or a cancel button 2307 is selected. If it is determined that the cancel button 2307 is selected, the process represented by the flowchart of FIG. 22 is terminated. If it is determined that information necessary for transmission of the license information 5000 is entered and the OK button 2306 is selected, the process proceeds to step S2203.

In step S2203, the job processor 3002 acquires, from the apparatus configuration manager 3003, an apparatus ID uniquely identifying the multifunction apparatus 1001. Then, the job processor 3002 acquires, from the application manager 3004, an application ID uniquely identifying an application corresponding to an application name entered in step S2201. In step S2204, the data transmitter/receiver 3001 transmits a line connection request to the transmission destination (the multifunction apparatus 1002) entered in step S2201, and a communication line with the transmission destination is connected.

In step S2205, the data transmitter/receiver 3001 determines whether connection of the communication line in step S2204 has been successfully established. If it is determined in step S2205 that connection of the communication line has not been successfully established, the process returns to step S2201. If it is determined in step S2205 that connection of the communication line has been successfully established, the process proceeds to step S2206. In step S2206, the job processor 3002 generates a first license transmission code on the basis of the apparatus ID and the application ID acquired in step S2203, and displays a display screen 2400 shown in FIG. 24 on the operation unit 212. On the display screen 2400 shown in FIG. 24, a transmission destination 2401 of the first license transmission code (the license information 5000), an application name 2402 and the number of times 2403 regarding the first license transmission code (the license information 5000) that is being transmitted are displayed. In addition, the data transmitter/receiver 3001 transmits the first license transmission code generated by the job processor 3002 to the designated transmission destination (the multifunction apparatus 1002). As described above, in this embodiment, a first generation unit and a first transmission unit can be implemented by the execution of the processing of step S2206.

In step S2207, the data transmitter/receiver 3001 waits until a second license transmission code is received from the transmission destination (the multifunction apparatus 1002) of the first license transmission code. After the data transmitter/receiver 3001 receives the second license transmission code, the process proceeds to step S2208. In step S2208, the job processor 3002 reads (for example, decrypts) the second license transmission code. As described above, in this embodiment, a first reception unit can be implemented by the execution of the processing of step S2207.

In step S2209, on the basis of the result obtained by the reading in step S2208, the job processor 3002 determines whether the received second license transmission code indicates transmission cancelation. If it is determined in step S2209 that the received second license transmission code indicates transmission cancelation, the process proceeds to step S2210. In step S2210, the job processor 3002 displays a display screen 2600 shown in FIG. 26 on the operation unit 212 that notifies the user that transmission of the license information 5000 has been canceled by the transmission destination (the multifunction apparatus 1002). On the display screen 2600 shown in FIG. 26, a transmission destination 2601 of the first license transmission code (the license information 5000), an application name 2602 and the number of times 2603 regarding the first license transmission code (the license information 5000) that has been transmitted are displayed. In step S2218, the data transmitter/receiver 3001 disconnects the communication line with the transmission destination (the multifunction apparatus 1002) designated in step S2201. Then, the process represented by the flowchart of FIG. 22 is terminated.

If it is determined in step S2209 that the received second license transmission code does not indicate transmission cancelation, the process proceeds to step S2211. In step S2211, on the basis of the result obtained by the reading in step S2208, the job processor 3002 determines whether the received second license transmission code is valid by checking if the entered data contains no mistakes. If it is determined in step S2211 that the received second license transmission code is invalid, the process returns to step S2201.

If it is determined in step S2211 that the received second license transmission code is valid, the process proceeds to step S2212. In step S2212, the job processor 3002 determines whether an apparatus ID of a transmission source apparatus and an application ID correspond to the multifunction apparatus 1001 in accordance with the contents of the received second license transmission code. If it is determined in step S2212 that the apparatus ID of the transmission source apparatus and the application ID do not correspond to the multifunction apparatus 1001, the received second license transmission code is determined to be a code for an apparatus, which is not the multifunction apparatus 1001, or a code that has been tampered with. Thus, the process proceeds to step S2219. In step S2219, the job processor 3002 performs error processing for, for example, displaying on the operation unit 212 a message indicating that an error has occurred. Then, the line is disconnected in step S2218 (described below), and the process represented by the flowchart of FIG. 22 is terminated. As described above, in this embodiment, a determination unit can be implemented by the execution of the processing of step S2212.

If it is determined in step S2212 that the apparatus ID of the transmission source apparatus and the application ID correspond to the multifunction apparatus 1001, the process proceeds to step S2213. In step S2213, the application manager 3004 locks up the license information 5000 so that the application whose license information 5000 is to be transferred cannot be used and the number of times cannot be changed. As described above, in this embodiment, an inhibition unit can be implemented by the execution of the processing of step S2213.

In step S2214, the license manager 3005 performs subtraction of the number of times (or the term of validity) designated by the user in step S2201 from the number of times (or the term of validity) of the license information 5000 to be transferred. Accordingly, the license information 5000 of the application designated by the user in step S2201 in the multifunction apparatus 1001 is updated.

As described above, in this embodiment, an updating unit can be implemented by the execution of the processing of step S2214.

In step 2215, the job processor 3002 unlocks the license information 5000 that has been locked in step S2213. As described above, in this embodiment, a release unit can be implemented by the execution of the processing of step S2215.

In step S2216, the job processor 3002 generates a third license transmission code on the basis of the contents of the second license transmission code and the contents entered in step S2201 (the contents entered using the radio button 2303 and the contents entered in the entry fields 2304 and 2305). Here, the third license transmission code is encrypted. Then, the data transmitter/receiver 3001 transmits the third license transmission code generated by the job processor 3002 to the transmission destination (the multifunction apparatus 1002).

As described above, in this embodiment, a second generation unit and a second transmission unit can be implemented by the execution of the processing of step S2216.

In step S2217, the data transmitter/receiver 3001 waits until a transmission completion notification is received from the transmission destination (the multifunction apparatus 1002). After the transmission completion notification is received, the process proceeds to step S2218. In step S2218, the job processor 3002 displays a display screen 2500 shown in FIG. 25 on the operation unit 212 that notifies the user of the completion of transmission of the license information 5000. On the display screen 2500 shown in FIG. 25, a transmission destination 2501 of the third license transmission code (the license information 5000), an application name 2502 and the number of times 2503 regarding the third license transmission code (the license information 5000) that has been transmitted are displayed. In step S2218, the data transmitter/receiver 3001 disconnects the communication line with the transmission destination (the multifunction apparatus 1002) designated in step S2201, and the process represented by the flowchart of FIG. 22 is terminated.

Figure 27:
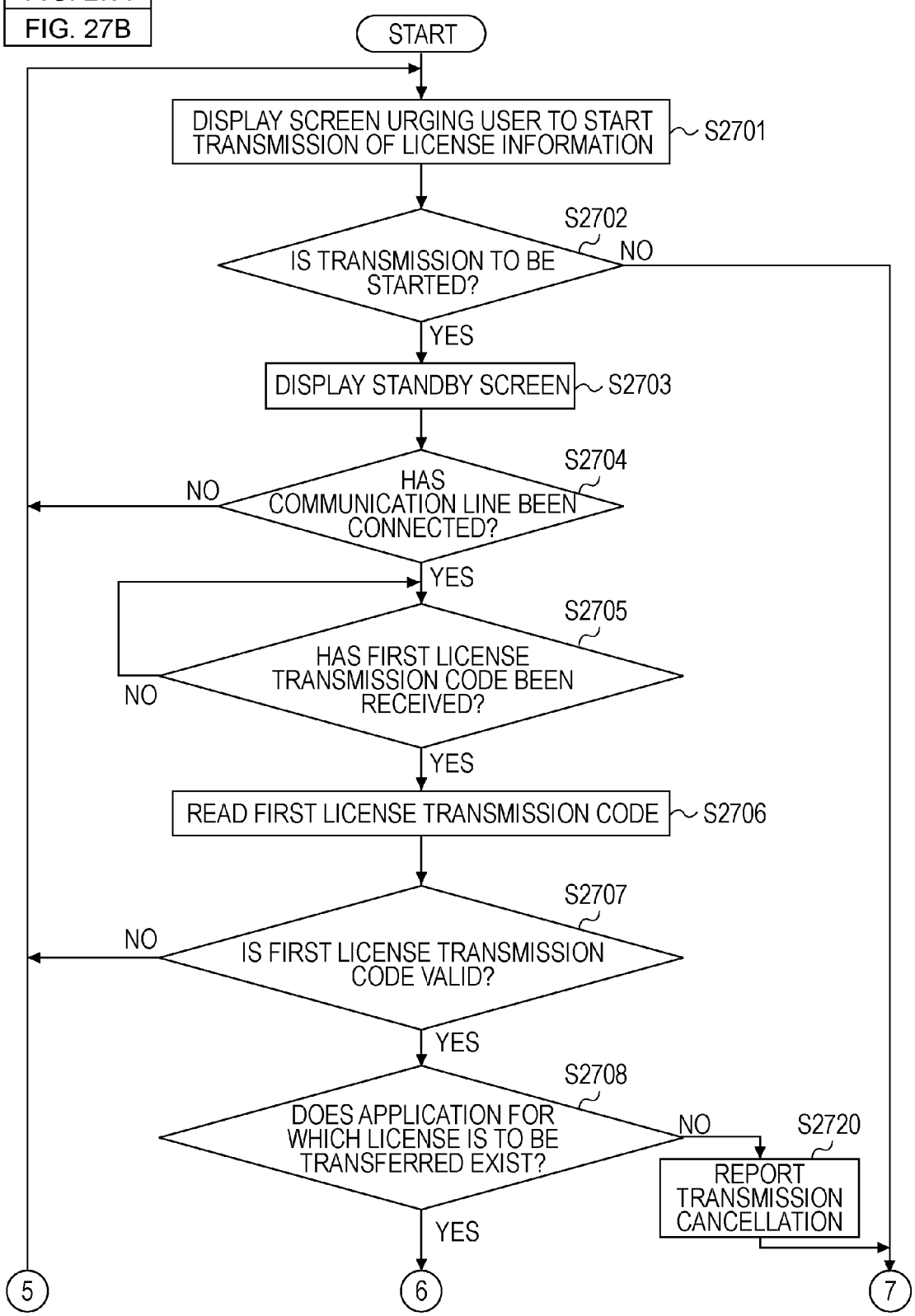
FIG. 27 is a flowchart showing an example of a process to be performed by a multifunction apparatus serving as a transmission destination to accept transfer of the license information.
Figure 28:
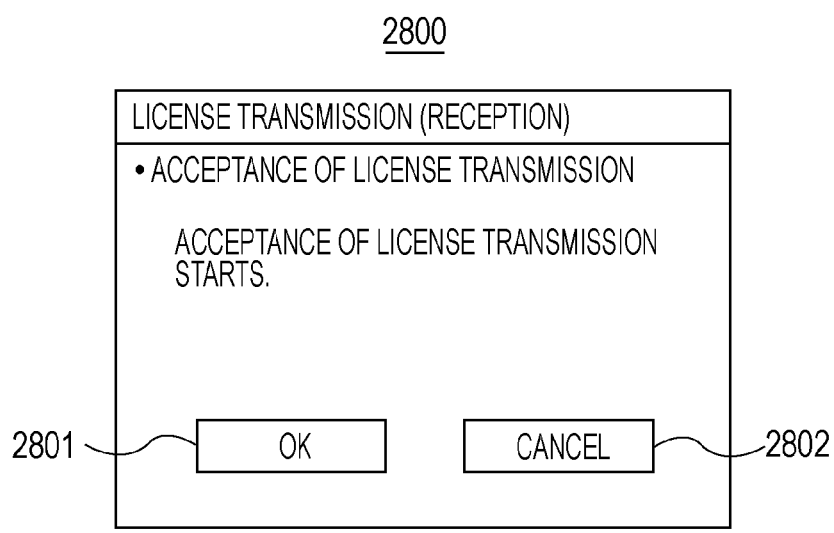
FIG. 28 illustrates an example of a display screen urging the user to issue an instruction to accept the license information.
Figure 29:
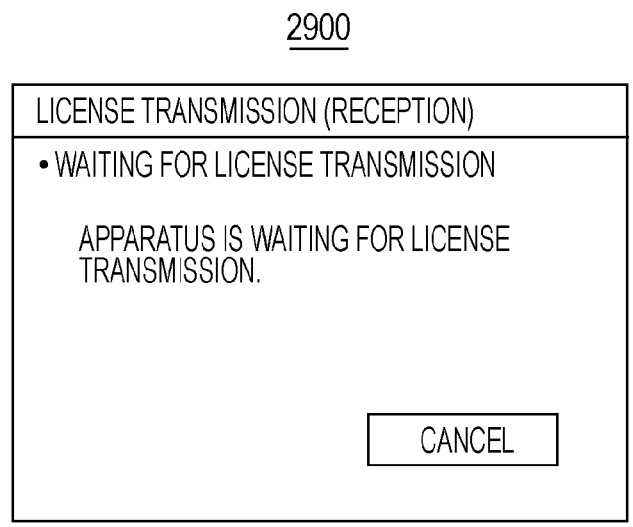
FIG. 29 illustrates an example of a display screen to be displayed when the multifunction apparatus is waiting for transmission of the license information.
Figure 30:
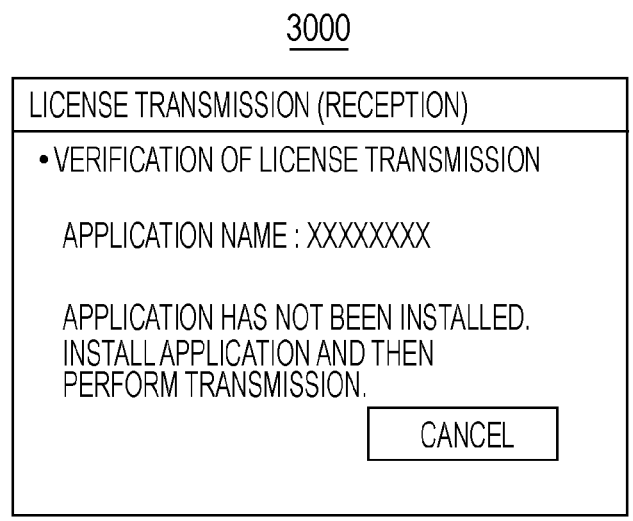
FIG. 30 illustrates an example of a display screen to be displayed in a case where an application relating to the license information to be transferred has not been installed in the multifunction apparatus serving as the transmission destination.

An example of a process to be performed by the multifunction apparatus 1002 in a case where license information is transferred in a state where connection with a network is established will be described with reference to FIGS. 27 to 30. FIG. 27 is a flowchart showing an example of a process to be performed by the multifunction apparatus 1002 to accept transfer of license information. FIG. 28 illustrates an example of a display screen urging the user to issue an instruction to accept license information. FIG. 29 illustrates a display screen to be displayed when the multifunction apparatus 1002 is waiting for transmission of license information. FIG. 30 illustrates an example of a display screen to be displayed in a case where an application regarding license information to be transferred has not been installed in the multifunction apparatus 1002.

In step S2701, when the user issues an instruction to transmit the license information 5000 via the network by using the operation unit 212 of the multifunction apparatus 1002, the job processor 3002 displays a display screen 2800 shown in FIG. 28 on the operation unit 212. Accordingly, the user is urged to issue an instruction to start transmission.

In step S2702, the job processor 3002 determines whether an instruction to start transmission of the license information 5000 has been issued on the display screen 2800 in step S2701. That is, the job processor 3002 determines whether an OK button 2801 is selected and an instruction to start transmission of the license information 5000 is issued or a cancel button 2802 is selected and an instruction to start transmission of the license information 5000 is not issued.

If it is determined in step S2702 that an instruction to start transmission of the license information 5000 is not issued, the process represented by the flowchart of FIG. 27 is terminated. If it is determined in step S2702 that an instruction to start transmission of the license information 5000 is issued, the process proceeds to step S2703. In step S2703, the job processor 3002 displays a display screen 2900 shown in FIG. 29 on the operation unit 212 that notifies the user that the multifunction apparatus 1002 is waiting for transmission of a first license transmission code (the license information 5000).

In step S2704, the data transmitter/receiver 3001 opens a communication line, receives a line connection request from a transmission source (the multifunction apparatus 1001), and waits until connection of the communication line with the transmission destination is established. After connection of the communication line is established, the process proceeds to step S2705. In step S2705, the data transmitter/receiver 3001 waits until a first license transmission code is received from the multifunction apparatus 1001. Then, after the first license transmission code is received, the process proceeds to step S2706. In step S2706, the job processor 3002 reads the first license transmission code received in step S2705. As described above, in this embodiment, a first reception unit can be implemented by the execution of the processing of step S2705.

In step S2707, on the basis of the result obtained by the reading in step S2706, the job processor 3002 determines whether the received first license transmission code is valid by checking if the entered data contains no mistakes. If it is determined in step S2707 that the received first license transmission code is invalid, the process returns to step S2701.

If it is determined in step S2707 that the received first license transmission code is valid, the process proceeds to step S2708. In step S2708, the application manager 3004 determines, in accordance with the contents of the received first license transmission code, whether the application for which the license information 5000 is to be transferred has been installed in the multifunction apparatus 1002. If it is determined in step S2708 that the application for which the license information 5000 is to be transferred has not been installed in the multifunction apparatus 1002, the process proceeds to step S2720. In step S2720, the job processor 3002 displays a display screen 3000 shown in FIG. 30 on the operation unit 212 that urges the user to install the application into the multifunction apparatus 1002. Furthermore, the job processor 3002 generates a second license transmission code indicating transmission cancellation. The data transmitter/receiver 3001 transmits the second license transmission code generated by the job processor 3002 to the multifunction apparatus 1001 so that the multifunction apparatus 1001 is notified of transmission cancellation. Then, the process represented by the flowchart of FIG. 27 is terminated.

If it is determined in step S2708 that the application for which the license information 5000 is to be transferred has been installed in the multifunction apparatus 1002, the process proceeds to step S2709. In step S2709, the job processor 3002 acquires, from the apparatus configuration manager 3003, an apparatus ID uniquely identifying the multifunction apparatus 1002 and a unique ID.

In step S2710, the job processor 3002 generates a second license transmission code on the basis of the contents of the first license transmission code read in step S2706 and the apparatus ID and the unique ID acquired in step S2709. Here, the second license transmission code is encrypted. The data transmitter/receiver 3001 transmits, to the multifunction apparatus 1001, the second license transmission code generated by the job processor 3002. As described above, a first generation unit and a first transmission unit can be implemented by the execution of the processing of step S2710.

In step S2711, the data transmitter/receiver 3001 waits until a third license transmission code is received from the multifunction apparatus 1001. After the third license transmission code is received, the process proceeds to step S2712. In step S2712, the job processor 3002 reads (for example, decrypts) the received third license transmission code. As described above, in this embodiment, a second reception unit can be implemented by the execution of the processing of step S2711.

In step S2713, on the basis of the result obtained by the reading in step S2712, the job processor 3002 determines whether the received third license transmission code is valid by checking if the entered data contains no mistakes. If it is determined in step S2713 that the received third license transmission code is invalid, the process returns to step S2701.

If it is determined in step S2713 that the received third license transmission code is valid, the process proceeds to step S2714. In step S2714, the job processor 3002 determines, on the basis of the contents of the received third license transmission code, whether the apparatus ID of the transmission destination, the application ID, and the unique ID correspond to the multifunction apparatus 1002. If it is determined in step S2714 that the apparatus ID of the transmission destination, the application ID, and the unique ID do not correspond to the multifunction apparatus 1002, the received third license transmission code is determined to be a code for an apparatus, which is not the multifunction apparatus 1002, or a code that has been tampered with. Then, the process proceeds to step S2721. In step S2721, the job processor 3002 performs error processing for, for example, displaying on the operation unit 212 a message indicating that an error has occurred. Then, a transmission completion notification is transmitted in step S2719 (described below) and the process represented by the flowchart of FIG. 27 is terminated. As described above, in this embodiment, a determination unit can be implemented by the execution of the processing of step S2714.

If it is determined in step S2714 that the apparatus ID of the transmission destination, the application ID, and the unique ID correspond to the multifunction apparatus 1002, the process proceeds to step S2715. In step S2715, the application manager 3004 locks up the license information 5000 so that the application for which the transfer of the license information 5000 is to be accepted cannot be used and the number of times cannot be changed. As described above, in this embodiment, an inhibition unit can be implemented by the execution of the processing of step S2715.

In step S2716, the license manager 3005 reads the license information 5000 to be accepted, and performs addition of the number of times (the term of validity) of the license information 5000 on the basis of the contents of the third license transmission code read in step S2712. Accordingly, the license information 5000 of the application designated by the user in step S2201 of FIG. 22 in the multifunction apparatus 1002 is updated. As described above, in this embodiment, an updating unit can be implemented by the execution of the processing of step S2716.

In step S2717, the job processor 3002 unlocks the license information 5000 that has been locked in step S2715. As described above, in this embodiment, a release unit can be implemented by the execution of the processing of step S2717.

In step S2718, the apparatus configuration manager 3003 updates the unique ID. In step S2719, the data transmitter/receiver 3001 transmits a transmission completion notification to the transmission source (the multifunction apparatus 1001) so that the multifunction apparatus 1001 is notified of the completion of transmission of the license information 5000. Then, the process represented by the flowchart of FIG. 27 is terminated.

As described above, in this embodiment, the multifunction apparatus 1001, which serves as a transmission source of the license information 5000, and the multifunction apparatus 1002, which serves as a transmission destination of the license information 5000, perform transmission and reception of first and third license transmission codes online via the network (the LAN 1006). Thus, in a case where the multifunction apparatuses 1001 and 1002 communicate with each other online, advantages similar to those described in the exemplary embodiment described can also be achieved in the present embodiment.

The units constituting the information processing apparatuses, the units constituting the right-of-use transfer systems, the steps for the right-of-use transfer methods, and the steps for the right-of-use acquiring methods in the above-described embodiments can be implemented by operations of programs stored in a RAM or a ROM of a computer.

In addition, an embodiment may be implemented by any form, such as a system, an apparatus, a method, a program, or a storage medium. More specifically, an aspect of the present invention may be applied to a system constituted by a plurality of apparatuses or equipment constituted by a single apparatus.

According to an aspect of the present invention, programs of software implementing the functions of the above-described embodiments (in the above-described embodiments, programs corresponding to the flowcharts shown in FIGS. 5, 7, 10, 14, 18, 22, and 27) are supplied to the system or the apparatus. In addition, an aspect of the present invention can also be attained when a computer of the system or the apparatus reads and executes supplied program code.

The computer program may be of any type, such as object code, a program to be executed by an interpreter, or script data to be supplied to an operating system (OS), as long as it has a function of a program.

For example, a floppy disk, a hard disk, an optical disk, a magneto-optical (MO) disk, a compact disc read-only memory (CD-ROM), a compact disc recordable (CD-R), a compact disc rewritable (CD-RW), a magnetic tape, a non-volatile memory card, a ROM, a digital versatile disc read-only memory (DVD-ROM), or a DVD-R can be used as a recording medium for supplying the program.

In addition, the program can be obtained by connecting to a website on the Internet using a browser of a client computer and by downloading a computer program according to an aspect of the present invention or a compressed file having an automatic installation function from the website to a storage medium, such as a hard disk.

In addition, the program may be supplied by dividing the program code constituting the program according to an aspect of the present invention into a plurality of files and by downloading the divided files from different websites. A World Wide Web (WWW) server for allowing a plurality of users to download a program file for attaining functional processing of an aspect of the present invention on a computer also falls within the scope of the present invention.

In addition, a program according to an aspect of the present invention may be encoded and stored in a storage medium, such as a CD-ROM, and may be distributed to users. Only a user who satisfies predetermined conditions may be able to download key information for decoding the encoded program from a website via the Internet. In addition, the encoded program can be executed by using the downloaded key information and can be installed into a computer.

In addition, the functions of the above-described embodiments can be attained when the read program is executed by the computer. The functions of the above-described embodiments can also be attained when part or all of the actual processing is performed by an operating system (OS) or the like running on the computer on the basis of instructions of the program.

Furthermore, the program read from the recording medium may be written to a memory arranged in a function expansion board inserted in the computer or a function expansion unit connected to the computer. The functions of the above-described embodiments can also be attained when part or all of the actual processing is performed by a CPU or the like arranged in the function expansion board or the function expansion unit on the basis of instructions of the program.

The above-described embodiments are merely exemplary examples for implementing the present invention. The technical scope of the present invention should not be limitedly understood by the above-described embodiments. Various changes and modifications may be made to the present invention without departing from the technical spirit or the main feature of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-188620 filed Jul. 19, 2007, which is hereby incorporated by reference herein in its entirety.

What is claimed is:

1. An information processing apparatus for transferring a right of use of application software to a destination information processing apparatus, comprising:
 a first generation unit configured to, when a user designates the application software, of which at least part of the right of use is to be transferred, generate a first code based on application identification information identifying the designated application software and apparatus identification information identifying the information processing apparatus;
 a first transmission unit configured to transmit the first code generated by the first generation unit;
 a first reception unit configured to receive a second code based on the first code and apparatus identification information identifying the destination information processing apparatus;
 a second reception unit configured to receive transfer detail information indicating transfer details of the right of use;
 a second generation unit configured to generate a third code based on the second code received by the first reception unit and the transfer detail information received by the second reception unit;
 a second transmission unit configured to transmit the third code generated by the second generation unit; and
 an updating unit configured to update right-of-use information indicating the right of use of the application software in the information processing apparatus based on the transfer detail information received by the second reception unit.

2. The information processing apparatus according to claim 1, further comprising:
 a determination unit configured to determine whether the second code received by the first reception unit is based on the first code generated by the first generation unit of the information processing apparatus,
 wherein when it is determined that the second code received by the first reception unit is based on the first code generated by the first generation unit of the information processing apparatus, the updating unit updates the right-of-use information indicating the right of use of the application software in the information processing apparatus.

3. The information processing apparatus according to claim 2, wherein
 when it is determined that the second code received by the first reception unit is based on the first code generated by the first generation unit of the information processing apparatus, the first generation unit generates the third code.

4. The information processing apparatus according to claim 1, further comprising:
 an inhibition unit configured to, after the second code is received by the first reception unit, inhibit the use of the application software, of which at least part of the right of use is to be transferred; and
 a release unit configured to, after the updating unit updates the right-of-use information indicating the right of use of the application software in the information processing apparatus, release the inhibition of the use of the application software, the inhibition being performed by the inhibition unit.

5. The information processing apparatus according to claim 1,
 wherein the first transmission unit notifies the user of the first code,
 wherein the first reception unit receives the second code in accordance with an operation performed by the user using an operation unit, and
 wherein the second transmission unit notifies the user of the third code.

6. The information processing apparatus according to claim 1,
 wherein the first transmission unit transmits the first code to the destination information processing apparatus via a network,
 wherein the first reception unit receives the second code from the destination information processing apparatus via the network, and
 wherein the second transmission unit transmits the third code to the destination information processing apparatus via the network.

7. An information processing apparatus for accepting transfer of a right of use of application software from a source information processing apparatus, comprising:
 a first reception unit configured to receive a first code based on application identification information identifying the application software, of which at least part of the right of use is to be transferred, and apparatus identification information identifying the source information processing apparatus;
 a first generation unit configured to generate a second code based on the first code received by the first reception unit and apparatus identification information identifying the information processing apparatus;
 a first transmission unit configured to transmit the second code generated by the first generation unit;
 a second reception unit configured to receive a third code based on the second code and transfer detail information indicating transfer details of the right of use; and
 an updating unit configured to update right-of-use information indicating the right of use of the application software in the information processing apparatus based on the third code received by the second reception unit.

8. The information processing apparatus according to claim 7, further comprising:
 a determination unit configured to determine whether the third code received by the second reception unit is based on the second code generated by the first generation unit of the information processing apparatus,
 wherein when it is determined that the third code received by the second reception unit is based on the second code generated by the first generation unit of the information processing apparatus, the updating unit updates the right-of-use information indicating the right of use of the application software in the information processing apparatus.

9. The information processing apparatus according to claim 7, further comprising:
an inhibition unit configured to, after the third code is received by the second reception unit, inhibit the use of the application software, of which at least part of the right of use is to be transferred; and
a release unit configured to, after the updating unit updates the right-of-use information indicating the right of use of the application software in the information processing apparatus, release the inhibition of the use of the application software, the inhibition being performed by the inhibition unit.

10. The information processing apparatus according to claim 7,
wherein the first reception unit receives the first code in accordance with an operation performed by a user using an operation unit,
wherein the first transmission unit notifies the user of the second code, and
wherein the second reception unit receives the third code in accordance with an operation performed by the user using the operation unit.

11. The information processing apparatus according to claim 7,
wherein the first reception unit receives the first code from the source information processing apparatus via a network,
wherein the first transmission unit transmits the second code to the source information processing apparatus via the network, and
wherein the second reception unit receives the third code from the source information processing apparatus via the network.

12. A system comprising:
a first information processing apparatus configured to transfer a right of use of application software; and
a second information processing apparatus configured to accept the right of use of the application software,
wherein the first information processing apparatus includes:
a first generation unit configured to, when a user designates the application software, of which at least part of the right of use is to be transferred, generate a first code based on application identification information identifying the designated application software and apparatus identification information identifying the first information processing apparatus;
a first transmission unit configured to transmit the first code generated by the first generation unit;
a first reception unit configured to receive a second code based on the first code and apparatus identification information identifying the second information processing apparatus;
a second reception unit configured to receive transfer detail information indicating transfer details of the right of use;
a second generation unit configured to generate a third code based on the second code received by the first reception unit and the transfer detail information received by the second reception unit;
a second transmission unit configured to transmit the third code generated by the second generation unit; and a first updating unit configured to update right-of-use information indicating the right of use of the application software in the first information processing apparatus based on the transfer detail information received by the second reception unit, and
wherein the second information processing apparatus includes:
a third reception unit configured to receive the first code transmitted from the first transmission unit;
a third generation unit configured to generate the second code based on the first code received by the third reception unit and the apparatus identification information identifying the second information processing apparatus;
a third transmission unit configured to transmit the second code generated by the third generation unit;
a fourth reception unit configured to receive the third code transmitted from the second transmission unit; and
a second updating unit configured to update right-of-use information indicating the right of use of the application software in the second information processing apparatus based on the third code received by the fourth reception unit.

13. A right-of-use transfer method for causing a first information processing apparatus to transfer a right of use of application software to a second information processing apparatus, the method comprising:
generating, when a user designates the application software, of which at least part of the right of use is to be transferred, a first code based on application identification information identifying the designated application software and apparatus identification information identifying the first information processing apparatus;
transmitting the generated first code;
receiving a second code based on the first code and apparatus identification information identifying the second information processing apparatus;
receiving transfer detail information indicating transfer details of the right of use;
generating a third code based on the received second code and the received transfer detail information;
transmitting the generated third code; and
updating right-of-use information indicating the right of use of the application software in the first information processing apparatus based on the received transfer detail information.

14. A computer-readable storage medium on which a program for causing a computer to perform a right-of-use transfer method for causing a first information processing apparatus to transfer a right of use of application software to a second information processing apparatus is stored, the right-of-use transfer method comprising:
generating, when a user designates the application software, of which at least part of the right of use is to be transferred, a first code based on application identification information identifying the designated application software and apparatus identification information identifying the first information processing apparatus;
transmitting the generated first code;
receiving a second code based on the first code and apparatus identification information identifying the second information processing apparatus;
receiving transfer detail information indicating transfer details of the right of use:
generating a third code based on the received second code and the received transfer detail information;

transmitting the generated third code; and updating right-of-use information indicating the right of use of the application software in the first information processing apparatus based on the received transfer detail information.

15. A right-of-use acquisition method for causing a second information processing apparatus to acquire a right of use of application software transferred from a first information processing apparatus, the method comprising:

receiving a first code based on application identification information identifying the application software, of which at least part of the right of use is to be transferred, and apparatus identification information identifying the first information processing apparatus;

generating a second code based on the received first code and apparatus identification information identifying the second information processing apparatus;

transmitting the generated second code;

receiving a third code based on the second code and transfer detail information indicating transfer details of the right of use; and updating right-of-use information indicating the right of use of the application software in the second information processing apparatus based on the received third code.

16. A computer readable storage medium on which a program for causing a computer to perform a right-of-use acquisition method for causing a second information processing apparatus to acquire a right of use of application software transferred from a first information processing apparatus is stored, the right-of-use acquisition method comprising:

receiving a first code based on application identification information identifying the application software, of which at least part of the right of use is to be transferred, and apparatus identification information identifying the first information processing apparatus;

generating a second code based on the received first code and apparatus identification information identifying the second information processing apparatus;

transmitting the generated second code;

receiving a third code based on the second code and transfer detail information indicating transfer details of the right of use; and updating right-of-use information indicating the right of use of the application software in the second information processing apparatus based on the received third code.

* * * * *